United States Patent
Kraus, Jr. et al.

(10) Patent No.: US 9,752,326 B2
(45) Date of Patent: Sep. 5, 2017

(54) MEMBRANE ROOFING

(75) Inventors: David P. Kraus, Jr., Amherst, NH (US); Derrick Slowikowski, Merrimack, NH (US); Ernesto S. Tachauer, Clinton, IA (US); William H. Shepard, Amherst, NH (US); Howard A. Kingsford, The Villages, FL (US); Peter C. Garrigus, Bryan, OH (US); Michael D. Murry, Wauseon, OH (US)

(73) Assignee: Velcro BVBA (BE)

( * ) Notice: Subject to any disclaimer, the term of this patent is extended or adjusted under 35 U.S.C. 154(b) by 806 days.

(21) Appl. No.: 13/613,351

(22) Filed: Sep. 13, 2012

(65) Prior Publication Data

US 2013/0000237 A1    Jan. 3, 2013

Related U.S. Application Data

(62) Division of application No. 12/420,267, filed on Apr. 8, 2009.

(Continued)

(51) Int. Cl.
*E04D 5/10* (2006.01)
*E04D 5/14* (2006.01)
(Continued)

(52) U.S. Cl.
CPC .............. *E04D 5/144* (2013.01); *B29C 39/18* (2013.01); *B29C 44/306* (2013.01);
(Continued)

(58) Field of Classification Search
USPC ......... 52/309.2, 309.5, 309.8, 408, 409, 411, 52/746.11, DIG. 13; 24/306
See application file for complete search history.

(56) References Cited

U.S. PATENT DOCUMENTS 3,135,820 A    6/1964    Hallett
3,389,518 A    6/1968    Horbach
(Continued)

FOREIGN PATENT DOCUMENTS

DE    2263375    7/1974
DE    4100902    2/1990
(Continued)

OTHER PUBLICATIONS

PCT/US2009/040003; Notification of Transmittal of the International Search Report and the Written Opinion of the International Searching Searching Authority, or the Declaration (3 pages); International Search Report (4 pages) Written Opinion of the International Searching Authority (8 pages) dated Jul. 7, 2009.
(Continued)

*Primary Examiner* — Charles A Fox
*Assistant Examiner* — Joseph J Sadlon
(74) *Attorney, Agent, or Firm* — Fish & Richardson P.C.

(57) ABSTRACT

A foam roofing underlayment is provided with a reinforcement membrane having an array of fastener elements for engaging fastener elements on a flexible roof membrane. The underlayment is formed by molding foam between the reinforcement membrane and a carrier membrane. The underlayment in secured to the roof using washers having fastener elements for engaging the fastener elements of the flexible roof membrane. An anti-peel flap with fastener elements is provided around the periphery of the washers. A slip sheet is used between the underlayment and the flexible roof membrane to permit accurate positioning of the flexible roof membrane prior to engagement of the fastener elements. The interstices between the fastener elements provide lateral moisture paths to vents in the flexible roof membrane.

12 Claims, 19 Drawing Sheets

Related U.S. Application Data

(60) Provisional application No. 61/043,983, filed on Apr. 10, 2008.

(51) Int. Cl.

| | | |
|---|---|---|
| *B29C 39/18* | (2006.01) | |
| *B29C 44/46* | (2006.01) | |
| *E04C 2/24* | (2006.01) | |
| *E04D 13/16* | (2006.01) | |
| *F24J 2/52* | (2006.01) | |
| *B29C 44/30* | (2006.01) | |
| *B29C 44/32* | (2006.01) | |
| *E04B 7/00* | (2006.01) | |
| *F24J 2/46* | (2006.01) | |

(52) U.S. Cl.
CPC .......... *B29C 44/321* (2016.11); *B29C 44/326* (2013.01); *B29C 44/461* (2013.01); *B29C 44/468* (2013.01); *E04C 2/243* (2013.01); *E04D 5/147* (2013.01); *E04D 13/1643* (2013.01); *F24J 2/5245* (2013.01); *F24J 2002/4659* (2013.01); *F24J 2002/5292* (2013.01); *Y02B 10/20* (2013.01); *Y02E 10/47* (2013.01)

(56) References Cited

U.S. PATENT DOCUMENTS

| | | | |
|---|---|---|---|
| 3,458,609 A | 7/1969 | Smith | |
| 3,658,107 A * | 4/1972 | Perina | 411/81 |
| 3,851,357 A * | 12/1974 | Ribich et al. | 24/306 |
| 3,895,797 A | 7/1975 | Moore | |
| 3,905,071 A | 9/1975 | Brumlik | |
| 3,909,998 A * | 10/1975 | Simpson et al. | 52/223.6 |
| 3,946,944 A | 3/1976 | Keyes et al. | |
| 3,971,184 A | 7/1976 | Van Wagoner | |
| 4,032,689 A | 6/1977 | Johnson et al. | |
| 4,037,296 A | 7/1977 | White | |
| 4,065,899 A | 1/1978 | Kirkhuff | |
| 4,182,406 A | 1/1980 | Holbrook | |
| 4,242,409 A | 12/1980 | Parker | |
| 4,279,958 A | 7/1981 | Ahmad | |
| 4,312,822 A | 1/1982 | Bonnet | |
| 4,346,541 A * | 8/1982 | Schmitt | B32B 3/28 |
| | | | 52/309.11 |
| 4,361,993 A | 12/1982 | Simpson | |
| 4,450,663 A * | 5/1984 | Watkins | 52/309.4 |
| 4,492,064 A | 1/1985 | Bynoe | |
| 4,513,548 A | 4/1985 | Parker | |
| 4,572,435 A | 2/1986 | Thompson | |
| 4,572,865 A | 2/1986 | Gluck et al. | |
| 4,581,186 A | 4/1986 | Larson | |
| 4,651,489 A | 3/1987 | Hodges et al. | |
| 4,677,248 A * | 6/1987 | Lacey | F24J 2/5211 |
| | | | 126/569 |
| 4,736,561 A | 4/1988 | Lehr | |
| 4,738,884 A | 4/1988 | Algrim et al. | |
| 4,751,802 A * | 6/1988 | Whitman | E04D 5/148 |
| | | | 52/410 |
| 4,770,292 A | 9/1988 | Handler | |
| 4,774,794 A * | 10/1988 | Grieb | 52/309.7 |
| 4,855,172 A * | 8/1989 | Chiu | 428/57 |
| 4,864,788 A | 9/1989 | Tippmann | |
| 4,894,060 A | 1/1990 | Nestegard | |
| 4,928,575 A * | 5/1990 | Smirlock et al. | 89/36.02 |
| 4,930,285 A | 6/1990 | Ward | |
| 4,996,812 A | 3/1991 | Venable | |
| 5,035,028 A * | 7/1991 | Lemke | 24/336 |
| 5,058,245 A * | 10/1991 | Saito | 24/306 |
| 5,058,247 A | 10/1991 | Thomas et al. | |
| 5,060,443 A | 10/1991 | Pacione | |
| 5,095,673 A | 3/1992 | Ward | |
| 5,116,439 A | 5/1992 | Raus | |
| 5,124,366 A | 6/1992 | Gluck et al. | |
| 5,170,690 A * | 12/1992 | Smirlock et al. | 89/36.08 |
| 5,177,922 A * | 1/1993 | Ovaert et al. | 52/410 |
| 5,239,802 A | 8/1993 | Robinson | |
| 5,282,616 A | 2/1994 | Stacavich-Notaro | |
| 5,302,001 A | 4/1994 | van Dis | |
| 5,311,716 A * | 5/1994 | Houssin | 52/410 |
| 5,384,939 A * | 1/1995 | Weber | 24/306 |
| 5,505,747 A | 4/1996 | Chesley et al. | |
| 5,518,795 A | 5/1996 | Kennedy et al. | |
| 5,537,793 A * | 7/1996 | Murasaki | 52/585.1 |
| 5,579,619 A | 12/1996 | Godschalx | |
| 5,580,638 A | 12/1996 | Kiser | |
| 5,665,286 A | 9/1997 | Sulzbach et al. | |
| D390,099 S * | 2/1998 | Bailey et al. | D8/387 |
| 5,746,027 A | 5/1998 | Bonerb | |
| 5,829,214 A | 11/1998 | Hart | |
| 5,900,350 A | 5/1999 | Provost et al. | |
| 5,985,391 A | 11/1999 | Denehy | |
| 6,006,482 A * | 12/1999 | Kelly | 52/409 |
| 6,035,498 A | 3/2000 | Buzzell et al. | |
| 6,092,344 A | 7/2000 | Kelly | |
| 6,131,353 A | 10/2000 | Egan | |
| 6,238,502 B1 * | 5/2001 | Hubbard | B32B 27/08 |
| | | | 156/290 |
| 6,256,957 B1 | 7/2001 | Kelly | |
| 6,287,665 B1 | 9/2001 | Hammer | |
| 6,306,477 B1 | 10/2001 | Pacione | |
| 6,314,700 B2 | 11/2001 | Starr | |
| 6,367,218 B2 | 4/2002 | Lombardo | |
| 6,372,176 B1 | 4/2002 | Ekendahl et al. | |
| 6,401,426 B1 | 6/2002 | Alderman et al. | |
| 6,421,980 B1 | 7/2002 | Alderman et al. | |
| 6,460,303 B1 | 10/2002 | Pacione | |
| 6,540,863 B2 | 4/2003 | Kenney et al. | |
| 6,666,638 B2 | 12/2003 | Craven | |
| 6,679,018 B2 * | 1/2004 | Georgeau | E04D 5/12 |
| | | | 52/408 |
| 6,689,449 B2 | 2/2004 | Hasan | |
| 6,742,313 B2 | 6/2004 | Ritland | |
| 6,773,780 B2 * | 8/2004 | Hutter, III | F16B 5/0208 |
| | | | 403/267 |
| 6,804,922 B1 | 10/2004 | Egan | |
| 6,852,185 B2 * | 2/2005 | Sanger | E04D 1/34 |
| | | | 156/71 |
| 6,938,386 B2 | 9/2005 | Ritland | |
| 7,056,462 B2 | 6/2006 | Provost et al. | |
| 7,141,283 B2 | 11/2006 | Janzen et al. | |
| 7,159,921 B2 | 1/2007 | Billarant et al. | |
| 7,168,221 B2 | 1/2007 | Hunter, Jr. | |
| 7,172,008 B2 | 2/2007 | VanBenschoten et al. | |
| 7,412,806 B2 | 8/2008 | Pacione et al. | |
| 7,622,187 B2 * | 11/2009 | Clarke | E04D 5/148 |
| | | | 428/304.4 |
| 7,765,756 B2 * | 8/2010 | Bontrager, II | 52/410 |
| 8,051,540 B2 | 11/2011 | Gallant et al. | |
| 8,322,101 B2 * | 12/2012 | Kelly | 52/409 |
| 8,440,284 B2 * | 5/2013 | Kelly | B32B 1/04 |
| | | | 428/121 |
| 2003/0029110 A1 | 2/2003 | Pacione | |
| 2003/0070391 A1 | 4/2003 | Tachauer et al. | |
| 2004/0068952 A1 | 4/2004 | Pacione | |
| 2004/0157036 A1 | 8/2004 | Provost et al. | |
| 2005/0081342 A1 | 4/2005 | Erickson et al. | |
| 2005/0196580 A1 | 9/2005 | Provost et al. | |
| 2006/0110572 A1 | 5/2006 | Herrero et al. | |
| 2006/0123727 A1 * | 6/2006 | Akins et al. | 52/409 |
| 2007/0193168 A1 * | 8/2007 | Fritz | 52/410 |
| 2007/0220823 A1 | 9/2007 | Akins et al. | |
| 2007/0264482 A1 | 11/2007 | Banker et al. | |
| 2008/0083183 A1 | 4/2008 | Rymell | |
| 2013/0139471 A1 | 6/2013 | Paradis et al. | |

FOREIGN PATENT DOCUMENTS

| | | |
|---|---|---|
| DE | 4206205 | 8/1993 |
| DE | 19752819 | 6/1999 |
| EP | 0146012 | 6/1985 |

(56) References Cited

FOREIGN PATENT DOCUMENTS

| EP | 0325528 | 7/1989 |
|---|---|---|
| EP | 1795654 | 6/2007 |
| EP | 1953306 | 8/2008 |
| JP | H08183082 | 7/1996 |
| WO | WO 98/36139 | 8/1998 |
| WO | WO 99/54420 | 10/1999 |
| WO | WO 00/43608 | 7/2000 |
| WO | WO 01/81771 | 11/2001 |
| WO | WO 2009/025650 | 2/2009 |

OTHER PUBLICATIONS

EP 09731047.8; European Office Action of European Patent Application No. 09 731 047.8 mailed Sep. 13, 2012 (5 pages).
Application No. 2,720,797; Canadian Office Action mailed Feb. 27, 2012; 5 pages.
Application No. 200980121412.8; Chinese Office Action issued May 23, 2012; 5 pages.
Application No. PCT/US2009/040003; International Preliminary Report on Patentability and Written Opinion mailed Oct. 21, 2010; 9 pages.
Application No. EP 13182030.0; European search report dated Oct. 16, 2013, 59 pages.
Application No. EP 13182030.0; European EP Communication dated May 15, 2014; 5 pages.

\* cited by examiner

MEMBRANE ROOFING

CROSS-REFERENCE TO RELATED APPLICATIONS

This is a divisional application and claims priority to U.S. patent application Ser. No. 12/420,267, filed on Apr. 8, 2009, entitled "Membrane Roofing" which claims priority to U.S. Ser. No. 61/043,983 filed Apr. 10, 2008. The disclosure of the aforementioned prior applications is hereby incorporated by reference in its entirety.

TECHNICAL FIELD

This invention relates to securing exterior building construction materials, such as roof membranes and siding that are exposed to environmental forces such as wind and rain.

BACKGROUND

Some buildings have roofs that are shingled. Some others have membrane roofs, in which a flexible membrane forms the outer environmental barrier. Many membrane roofs are flat or slightly sloped or arched. In general, roofing membranes are secured over rigid insulation boards, such as foam boards, that increase the thermal barrier properties of the roof.

Membrane roofs, like other roofs, must withstand severe environmental conditions, including high winds and hail. Winds can cause large pressure differentials across the roof membrane, and can actually lift or separate the membrane from the roof.

Wind uplift occurs when the air pressure below the roof system is greater than that above the system as wind flows over the building decreasing the pressure directly above the roof surface. The atmospheric pressure below the roof attempts to equalize this pressure differential, causing an upward push of air referred to as wind uplift.

The Underwriters Laboratories has developed a standard uplift test, the UL580 uplift test, to test the ability of membrane roofing constructions to withstand the high uplift forces that can be caused by high winds.

FM Global Approval LLC also provides uplift pressure and uplift pull test standards to ensure that "Mechanically attached assemblies tested . . . shall resist a minimum uplift pressure of 60 psf (2.9 KPa) when tested by the FM Approvals Uplift Pressure Test procedures . . . without release from the deck, and shall be maintained in place." The current, relevant UL and FM Global Approval Standard uplift test standards are incorporated herein by reference. Other industry standards also provide for testing roofing installations against conditions corresponding to hail, standing water, foot traffic, fire, and corrosion.

The FM Global Approval Standard #4470 defines "wind uplift" as:

The force generated by wind on a roof system or components in a roof system resulting from wind-induced pressures. Wind that is deflected around and across the surfaces of a building causes a drop in air pressure immediately above the roof surface (negative pressure); the air in the building will flow beneath the roof deck (positive pressure), and the combined uplift pressures tend to lift the roof upward. Wind uplift may also be caused by the introduction of wind underneath the roof edges where it can cause the roof assembly to pull away from the substrate. Roof loss by wind can be avoided, or prevented, by proper installation and adequate adhesion, attachment, or ballasting.

New roofing constructions and methods are sought to provide cost-effective installation and satisfactory uplift load resistance. Similarly, new constructions and methods are sought to retain other exterior construction materials, such as shingles and siding, to buildings or other structures.

SUMMARY

The details of one or more embodiments of the invention are set forth in the accompanying drawings and the description below. Other features, objects, and advantages of the invention will be apparent from the description and drawings, and from the claims.

One aspect of the invention features a construction underlayment including a rigid foam board having two broadest sides defining a thickness therebetween; and a reinforcing facing including a flexible base bonded across one of the broadest board sides and an array of touch fastener elements extending from the base and exposed for engagement.

In one implementation, the facing base is bonded directly to foam of the board. The facing can extend across an entire lateral extent of the board to cover substantially all of one of the broadest board sides. The array of touch fastener elements can cover substantially all of one of the broadest board sides.

In one example, the facing base includes a flexible resin membrane and the touch fastener elements have individual resin stems extending integrally from a surface of the membrane. In some cases, the touch fastener elements have molded heads defining overhangs for engaging fibrous loops.

In another implementation, the facing base further includes a tie layer between the membrane and the foam board. The tie layer can include a reinforcing scrim. The scrim can include fibers at least partially embedded in resin of the membrane and formed of a material selected to enhance bonding between the scrim fibers and the membrane resin. The tie layer of the reinforcing membrane can be made of glass fiber to improve dimensional stability and fire resistance.

In other implementations, float yarns are provided to further strengthen the closure and transfer the load between the fastener elements and loop filaments. Use of such float yarn in a touch fastener closure is described in U.S. Pub. No. 2005-0081342, titled Plastic Sheet Reinforcement, which is incorporated herein in its entirety by reference.

Still in other implementations, a scrim or tie layer is not necessary, for example, where fastener elements are bonded directly to a substrate. Bonding may be accomplished using adhesives or any known mechanical or chemical bonding mechanism.

In some cases, the foam board defines foam knit lines extending along a length of the board between adjacent foam portions, and the tie layer includes fibers disposed across the knit lines. In some cases the construction underlayment further includes a second resin membrane extending across an opposite broad side of the board. The resin membrane can be in an annealed state.

In one implementation, the construction underlayment further includes a touch fastener material on a side of the foam board opposite the reinforcing facing.

In another implementation, the touch fastener elements comprise individual exposed fiber loops or fiber segments of a field of hook-engageable fibrous material.

The broad sides of the foam boards, for some installations, each have a length and width and define a surface area of about 3 square meters (32 square feet). In some cases, the length of the foam board is at least about 1.2 meters (4 feet). In some cases, the facing base is continuous over at least about 24 inches (61 cm) in each of two orthogonal dimensions. Other common dimensions for construction materials include, 2 ft×4 ft (61 cm×122 cm), 4 ft×4 ft (122 cm×122 cm), and 2 ft×8 ft (61 cm×244 cm). The thickness of the foam board can range from about 0.25 inch (6.3 mm) to 4 inches (10 cm) and can be tapered to improve drainage.

In one implementation, the array of touch fastener elements has a density of about 1700 hooks per square inch (265 per square cm) and the touch fastener elements extend about 0.015 inch (0.4 mm) from the face of the membrane and are about 0.005 to 0.006 inch (0.13 to 0.15 mm) thick.

In some cases, the board has a nominal thickness of between 0.635 and 10.16 cm (0.25-4.0 in,) and a flexural strength of between at least about 275 to 689 KPa (40-100 psi), as tested in accordance with ASTM C 473, to support installation and precipitation loads across the span of the flutes of the roof decking.

In some cases, the facing base has a thickness, not including the fastener elements, of between about three and ten thousandths of an inch.

In some implementations, the facing base includes a tie layer between the membrane and the foam board. In some cases, the tie layer is paper, tissue paper or a non-woven fabric. The fabric includes a coating chemically bonded to the foam.

In some implementations, the reinforcing membrane is formed of polypropylene, nylon, polyester PVC, polyethylene, ethylene propylene or other suitable resins.

In some implementations, reinforcing membranes comprising touch fastener material covers the two broadest sides of the foam board. In some cases, application of similar touch fastener materials on the two broadest sides contributes to the dimensional stability, and particularly, the planarity or flatness of the foam board.

In some implementations, application of touch fastener material to both broadest sides allows the foam boards to be attached to one another in a layered configuration. In some cases, the adjacent touch fastener materials on two opposing layered foam boards are engageable. In other cases, a separate interfacing touch fastener material is interposed between the layered foam boards. For example, a material with loops present on both broad faces can be used between two foam boards faced with hook fastener material in a layered arrangement.

In some implementations, multiple foam boards are stacked to achieve increased R-values. In some cases, a first foam board layer is attached to the roof deck using fasteners and a second foam board layer is attached to the first layer using touch fasteners. Alternatively, the second foam board layer can be adhered to the first foam board.

In some instances, board layers can be stacked using an intermediate loop layer or by using alternating hook faced and loop faced boards. For example, an alternating stacked arrangement of hook faced boards with loop faced boards can be used for stacked roofing installations. In other instances, stacked board layers can be adhered together.

Such layered arrangements avoid thermal bridging caused by conduction of heat through full-length metal fasteners that typically extend between the roof decking and roof membrane in conventional installations. Thermal bridging is often evidenced in conventional installations by melted circles above full-length fasteners in light snow cover.

Thus, a stacked arrangement provides improved R values through additional layers and through elimination of thermal bridging across metal through fasteners.

In various implementations, different combination of hook and loop touch fastener material, loop and hook touch fastener material, self-engaging hook touch fastener materials can be used to form suitable facings and touch fastenings between mating surfaces.

For example, in some cases, the broad sides of the foam board are covered with loop touch fastener material. The loop material can be a nonwoven, spun bond or Velcro brand FNL series loop material. The loop material and the touch fastenings as a whole serves to reinforce the foam board in the installation.

In some implementations, the hook touch fastener material is present on the roofing membrane and loop touch fastener material is present on the foam board.

Another aspect of the invention features a construction insulation board including a rigid foam board having two broadest sides defining a thickness therebetween; and a reinforcing facing comprising a flexible touch fastener material bonded across one of the broadest board sides exposed for engagement across the board with a cooperative touch fastener material.

In some implementations, the touch fastener elements comprise touch fastener elements configured to engage a cooperative field of loop fibers to form a releasable fastening. In some implementations, the touch fastener material includes one of an array of male touch fastener elements and a field of loops.

In some implementations, the board includes a second reinforcing facing of a second touch fastener material bonded across the second broadest face of the foam board.

In another, alternative aspect, the invention features a method of forming construction underlayment. The method includes introducing a longitudinally continuous facing into a molding channel, the facing includes a flexible sheet-form base and an array of fastener elements extending from a fastening side of the base directed toward a surface of the molding channel. The method further includes introducing liquid resin to the molding channel, the liquid resin containing a foam agent that causes the liquid resin to foam to expand and fill the molding channel on a back side of the facing base, such that the foamed resin bonds to the facing. The method further includes solidifying the foamed resin to form a resin board having the facing bonded thereto.

In some cases, the molding channel is a substantially open corridor or trench and in other cases it is a substantially closed tube. Thus, the foam board underlayment can be formed using a free rise process with a single belted surface or a restrained rise process with upper and lower belted or restraining surfaces.

In some free rise applications a polyisocyanate foam is applied initially to a single facing layer of touch fastener material on a conveyor belt. In the free-rise process, a measured amount of liquid foam is applied to a lower facing and is allowed to flow and rise as the second facing layer is applied. The resulting foam thickness is predetermined as a function of the volume of foam applied. The free rise process is generally suitable for forming board thickness between about ¼" and 1.5" (6-38 mm) in thickness.

In other cases, the paper/facer is used during formation of the foam board and the hook material is post-adhered to the formed foam board. The hook material can be applied in-line or during a post-laminating step.

In some applications, the liquid resin is introduced as parallel lanes of resin that expand to form a single contiguous foam structure having corresponding knit lines, with the facing spanning multiple knit lines.

In other applications, the method includes introducing a carrier sheet to the molding channel, with the liquid resin disposed between the carrier sheet and the facing, such that the carrier sheet forms an opposite surface of the resin board.

The liquid foam can be carried into the molding channel on the carrier sheet.

In some cases, the carrier sheet includes fastener elements exposed on a face of the carrier sheet directed away from the liquid resin.

In some cases, the molding channel is formed by opposing belts that convey the resin and facing along the channel as the resin foams. The belts can include interconnected rigid belt segments. Segments of one of the belts can have extensions that come together to form side walls of the molding channel.

In some applications, the facing base includes a flexible resin membrane and the method includes bonding the foamed resin to the resin membrane. Prior to introducing the facing the facing membrane can be annealed. In some cases, annealing the membrane includes heating and manipulating the membrane. In some cases, annealing the membrane includes applying tension sufficient to cause local resin yielding. In other cases, annealing the membrane includes passing the membrane through a series of dancer rolls.

In some applications, the facing sheet is laminated to a continuous board material which is then cut into discrete board segments.

In other applications, the facing sheet is laminated to the board material after molding of the board material. The facing sheet can include a paper sheet.

In other applications, the facing material includes a paper backing.

In some applications, a fire resistant roofing board (e.g., gypsum board, DENSDECK™, or SECUROCK™ brand board) is installed under or over the foam board. A complementary or cooperating hook or loop touch fastener material can be applied to plywood, expanded polystyrene (EPS), extruded polystyrene (XPS), wood fiber board, perlite board, extruded plastic sheets, vacuum formed plastic sheets, corrugated sheeting, cementitous wood fiber board (e.g., Tectum™ brand board), DENSDECK™ or SECUROCK™ (gypsum), lightweight concrete board, lightweight insulating concrete board or other roofing or construction material.

For example, a fire resistant roofing board can be applied over the foam board. The fire resistant board can include a reinforcing membrane with an array of male fastener elements for attachment of the roofing membrane.

In some cases, the roofing membrane includes a weatherable and fire resistant material. In some cases the roofing membrane includes a reinforcing fabric of glass or polyester.

In some cases, the foam board, touch fastener material facing and touch fastening are selected to provide increased hail damage resistance. In conventional installations with the roofing membrane adhered to a paper or foil faced foam board, sever hail impacts cause tearing or creasing of the facing and separation of the roofing membrane from the underlying foam board. This can create a separated initiation location for later uplift separation.

In contrast, the touch fastener facing on the foam board serves to absorb and distribute hail impact forces, maintaining engagement between the membrane and foam board. For example, plastic deformation of the foam board and touch fastener material facing can absorb hail impact forces that would typically tear or crease conventional foil and paper foam board facing materials. The touch fastener closure between the roof membrane and foam board remains engaged even after such plastic deformation, preventing the impact points from becoming separation initiation points later during uplift loading.

In some cases, the roofing deck includes concrete, corrugated steel, exterior plywood or other substantially rigid deck material.

In another aspect, the invention features a roof including a roof deck; underlayment secured to the roof deck, the underlayment including one or more rigid foam boards each having a reinforcing membrane bonded across an upper surface of the board, the reinforcing membrane formed of a flexible resin and carrying an array of fastener elements having stems formed of the flexible resin; and a flexible roof membrane extending over the underlayment, the roof membrane including a water-impervious sheet with a field of fastener elements exposed on an underside thereof and engaged with the fastener elements of the underlayment to secure the roof membrane.

In some implementations, the field of fastener elements of the roof membrane includes a field of hook-engageable loops.

In some cases, the fastener elements of the underlayment and the loops of the roof membrane form a fastening with a nominal shear slack of about 1.524 mm+/−0.762 mm (0.060 in +/−0.03 in), i.e., between about 0.762 mm (0.030 inch) and 1.524 mm (0.090 inch) or between about 1.27 mm (0.050 inch) and 1.778 mm (0.070 inch).

In some implementations, the roof is constructed to withstand up-lift forces of at least about 4.309 Newton/square meter (90 pound/square foot), at least about 7.182 Newton/square meter (150 pound/square foot), or at least about 10.773 Newton/square meter (225 pound/square foot). In some cases, the materials and configuration of the foam board, touch fastener materials, roofing membrane can be selected to achieve even higher uplift resistance, for example, in known hurricane regions.

In some implementations, the roof is constructed to withstand an average per hook up-lift force of at least about 0.022 Newton per hook (0.005 lbf/hook), at least about 0.067 Newton/hook (0.015 lbf/hook) and preferably at least about 0.133 Newton/hook (0.030 lbf/hook). Where not all hooks are fully engaged in a given fastening, an average force per hook can still be determined through uplift testing as described below.

In some cases, the fastener elements are mushroom shaped.

In some cases, the underlayment is secured to the roof deck by engaged touch fasteners.

In some implementations, the underlayment is secured to the roof deck in part by washers having fastener elements for engaging fastener elements on the roof membrane.

In some implementations, the washers do not include touch fastener elements. For example, the washers can be smooth or ribbed and can be made of steel or plastic. Suitable membrane roofing washers and screws are available under the Trufast™ brand. Also, the insulation board can be attached to one another and/or to the roof deck with hot asphalt or with adhesive, e.g., Insta-Stik™ brand urethane adhesive.

The washer can include a peripheral anti-peel flap having fastener elements for engaging fastener elements on the roof membrane.

The water-impervious sheet can include an outer surface exposed to atmosphere.

In some implementations, ballast is secured to an upper surface of the membrane by touch fastener elements. For example, paver block ballast can be distributed along the roof edges and secured to the membrane by touch fastener elements.

In some implementations, multiple layers of underlayment and stacked together with a lower layer secured to the roof deck via through fasteners and an upper layer secured via one of touch fastener elements and adhesive.

In another aspect, the invention features a method of roofing a structure. The method includes securing an underlayment to a roof deck, the underlayment includes one or more rigid foam boards each having a flexible resin reinforcing membrane bonded across an upper surface of the board and carrying an array of fastener elements having stems formed of the flexible resin; positioning a flexible roof membrane to extend over the underlayment, the roof membrane includes a water-impervious sheet with a field of fastener elements exposed on an underside thereof to engage with the fastener elements of the underlayment to secure the roof membrane; and mechanically enhancing engagement of the fastener elements of the flexible roof membrane and underlayment.

Enhancing engagement can include at least one of rolling, orbital massaging and multi-directional stretching.

Some applications include providing a slip sheet between the underlayment and the flexible roof membrane to prevent engagement of the respective fastener elements of the underlayment and roof membrane. The method further includes adjusting the positioning of the flexible roof membrane over the underlayment; and moving the slip sheet to allow engagement of the fastener elements of the flexible roof membrane and underlayment.

In some applications, the method includes positioning a second slip sheet adjacent the first slip sheet to prevent the fastener elements from engaging beyond the region of the first slip sheet.

Moving the slip sheet can include incrementally advancing the slip sheet between the flexible roof membrane and the underlayment to engage incremental sections of the fastener elements of the flexible roof membrane and the underlayment. Alternatively, moving the slip sheet can include removing the slip sheet from between the flexible roof membrane and the underlayment.

In some cases, engagement is indicated by witness marks or other visual aids that indicate either treatment by an engagement enhancing process or engagement itself.

In some cases, positioning the flexible roof membrane includes simultaneously unrolling the flexible roof membrane and the slip sheet previously rolled up with the flexible roof membrane.

In some applications, the method includes providing multiple vents through the flexible roof membrane to permit the escape of moisture from beneath the flexible roof membrane, the interstices between the engaged fastener elements provide lateral moisture paths to the vents.

In some installations, a vented roof includes pressure passages through the membrane roofing installation to neutralize upward pressure differentials in high winds. One known vented installation is commonly known as the Stevens Vented Roof System. Such systems are designed to neutralize the pressure differentials caused by wind and keep the membrane tightly secured to a roofing deck or air barrier over steel or wood.

In some cases, perforated tubes are disposed between the membrane and the underlayment to provide ambient or forced air flow and/or venting.

Various features of the invention are applicable in totally adhered, partially adhered, and mechanically attached roofing applications. For example, in some cases, fastener elements across the broad surface of the membrane can engage mating fastener elements on an underlayment, including single or batten-type fasteners.

DESCRIPTION OF DRAWINGS

Like reference symbols in the various drawings indicate like elements.

DETAILED DESCRIPTION

Figure 1:
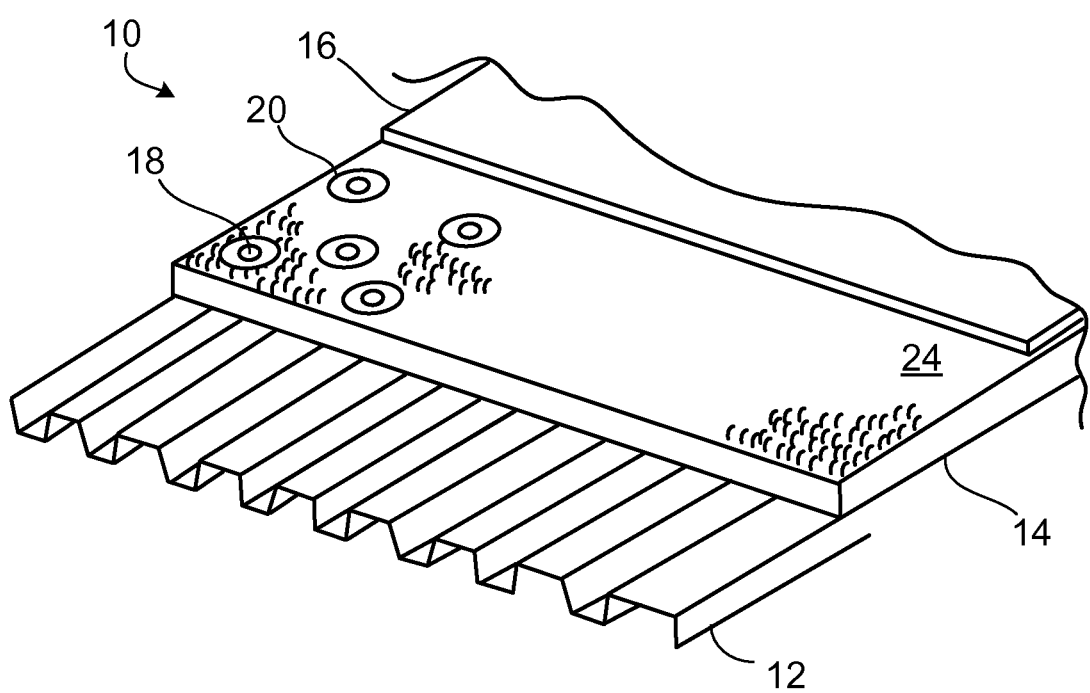
FIG. 1 is a perspective view of a partially constructed membrane roof.
Figure 2:
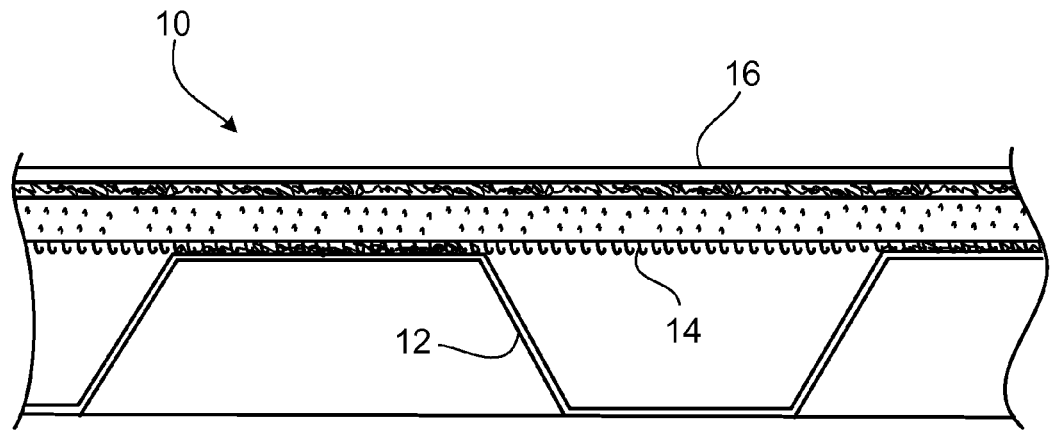
FIG. 2 is a cross-section view of the completed membrane roof.

Referring first to FIGS. 1 and 2, a roof 10, such as of a house or commercial structure, includes a structural roof deck 12 to which rigid insulation 14 is secured. A roofing membrane 16 is then secured over the rigid insulation as an environmental barrier. The roof deck 12 may be fashioned of corrugated metal sheet as shown, or of wood, concrete, cementitious wood fiber (e.g., Tectum™), lightweight concrete and lightweight insulating concrete and/or structural beams, for example, and provides a supporting surface for the roof. The rigid insulation 14 is made up of several rigid boards placed edge to edge across the roof deck to form an underlayment that serves as a thermal barrier. Typical board sizes are 4 ft×8 ft (1.2×2.4 meters) or 2 ft×4 ft (0.6×1.2 meters), 4 ft×4 ft (1.2×1.2 meters) and 2 ft×8 (0.6×2.4 meters). The thickness of the foam board can range from about 0.25 in to 4 in (0.635-10.16 cm), in some cases between 1.5 and 2.0 inches (37 to 50 mm), for example, and may be stacked for increased thickness or insulation or tapered for improved drainage. Touch fasteners may also be used to bond stacked layers. Board thickness may also be varied, for example, to produce a tapered panel for improved watershed, drainage or insulation capacity. In these examples the rigid boards are formed primarily of foam, with upper and/or lower skins of materials to be discussed below. The membrane 16 may be of EPDM, PVC, TPO or other resin, or modified bitumen membrane, for example, and provides an outer roof surface that resists water intrusion and protects the roof from environmental damage.

Figure 3:
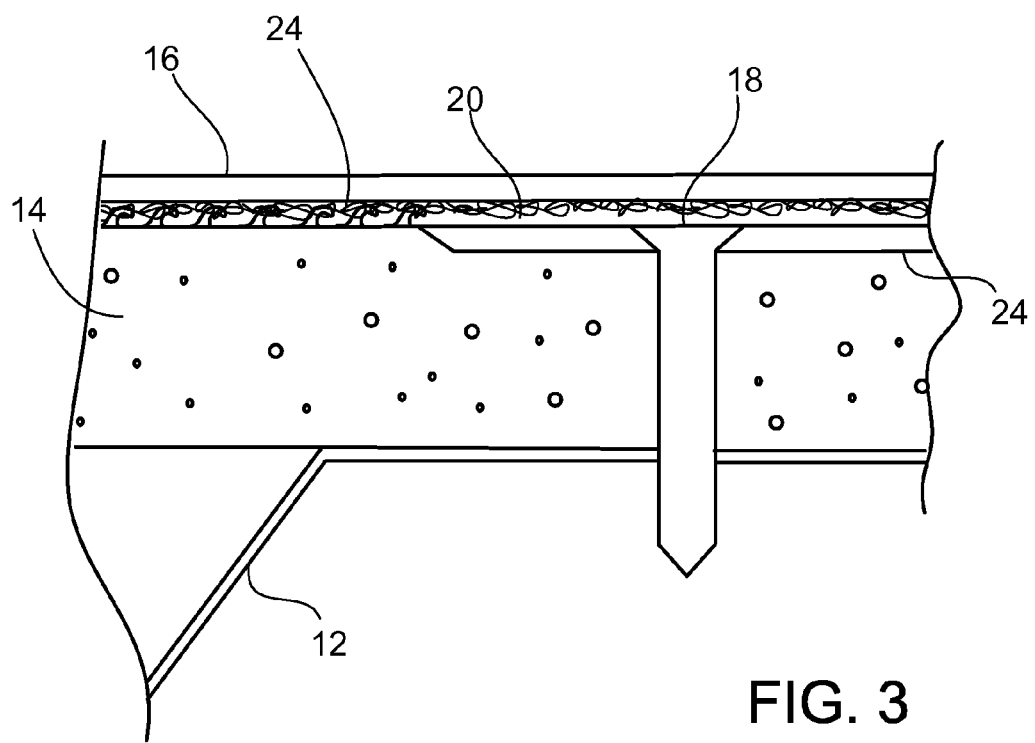
FIG. 3 is an enlarged cross-sectional view of the roof, showing a roofing underlayment fastener.

The insulation 14 may be secured to the roof deck 12 by threaded single-type fasteners 18 and load distribution washers 20, as shown in FIGS. 1 and 3, or by touch fasteners (e.g., hook-and-loop fasteners), as shown in FIG. 2 and discussed further below. Alternatively or additionally, battens may also be used in combination with the mechanical fastening systems described herein. If by threaded fasteners, the fasteners may be of 0.168 inch (4.3 mm) shank diameter and arranged in any pattern known in the art, and typically include washers 20 of about two to three inch (51-75 mm) diameter to distribute the fastening load through the foam.

Single-type fasteners 18 are installed in a pattern with washers 20 installed thereon to provide increased stress distribution. Fasteners 18 can be selected to penetrate the roofing structures to a desired depth. Portions of membrane 16 can be reinforced as predetermined locations for fasteners 18, reducing the number or size of fasteners 18 or washers 20. Any type, number, size and pattern of fasteners 18 and washers 20 can be (a) installed under membrane 16 with adhesive applied to the top surface of washers 20; (b) installed through membrane 16 and sealed (i.e., piercing membrane 16); (c) installed within the lap of overlapping portions of membrane 16; or (d) applied under membrane 16 with an integral fastener above (e.g., non-piercing types). Thus, fasteners 18 are but one example of use of distributed single-type fasteners to secure membrane 16. Suitable washers and threaded fasteners and are available from Trufast, LLC of Bryan, Ohio under the product names MP-3 Plates and DP Fasteners.

Figure 4:
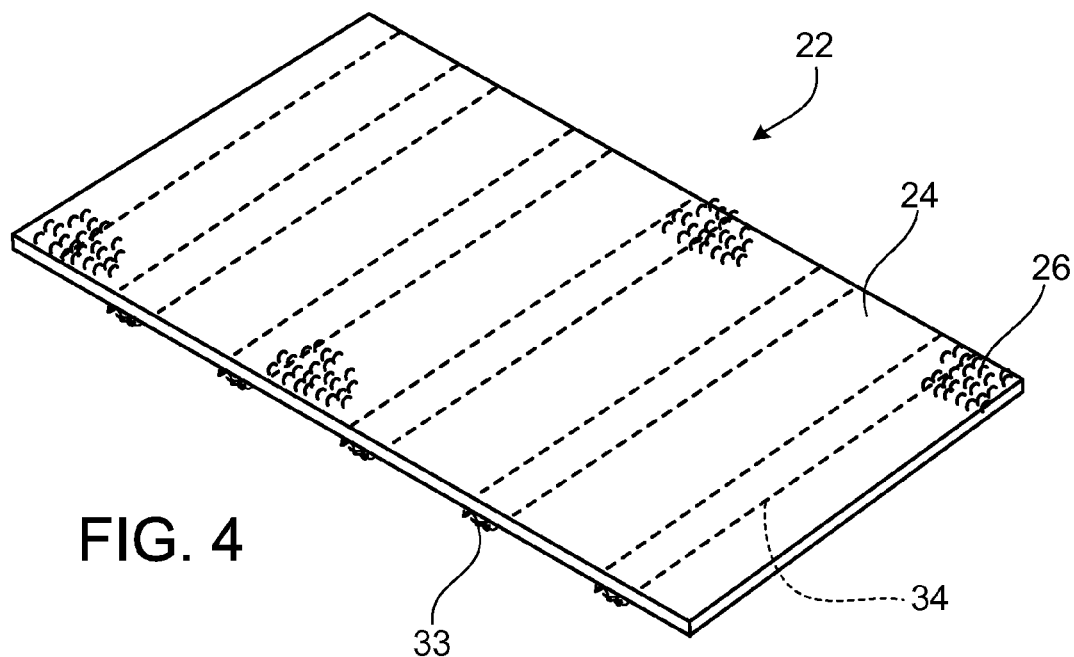
FIG. 4 is a perspective view of one of the rigid foam underlayment boards of the roof of FIG. 1.
Figure 5:
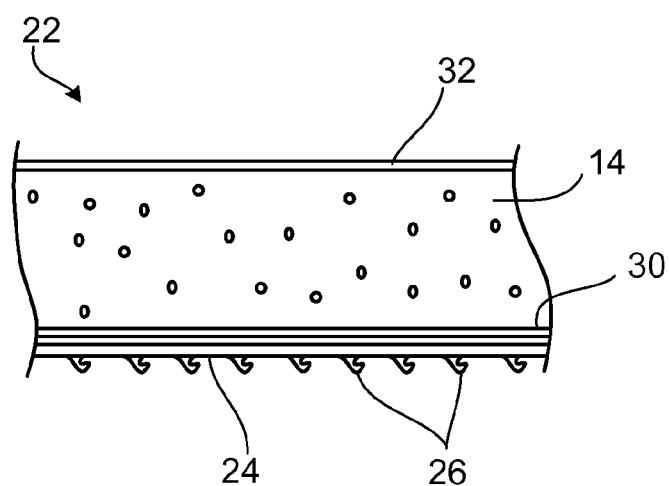
FIG. 5 is a cross-sectional view of an underlayment board having a hook fastener reinforcing membrane as a facing on one side and a paper facing on the other side.

Referring next to FIGS. 4 and 5, board 22 of rigid foam insulation 14 is a rectangular structure having a length, width, and a thickness substantially less than the width or length. Notably, it has a reinforcing membrane 24 bonded across a broad surface of the board and formed of a flexible resin. The reinforcing membrane 24 carries an array of male fastener elements 26 having stems formed of the flexible resin forming the membrane. Membrane 24 is shown as covering the upper surface of board 22 in FIG. 4, which is inverted in FIG. 5. The fastener elements may be hook-shaped, as shown in FIG. 5, or mushroom-shaped, for example. Other fastener element shapes may be substituted, depending on the application. In this example the fastener elements are of a CFM-29 shape, available from Velcro USA, Inc. of Manchester, N.H., and described in U.S. Pat. No. 5,900,350, the entire contents of which are hereby incorporated by reference. Other methods of forming fastener elements are disclosed in U.S. Pat. Nos. 5,505,747, 4,894,060 and 5,058,247, each of which are also incorporated herein in their entirety.

Membrane 24, with its hooking elements, forms a flexible reinforcing layer or skin across the entire board 22. This provides a means of securing the roof membrane to the board, while at the same time increasing the ability of the board to withstand uplift loads applied, for example, by extreme winds. It is believed that the improved load capacity of the roofing underlayment from the presence of the board reinforcing membrane may be more than a 'skin effect', as the membrane spans and reinforces knit lines and other weak regions of the board that can be caused by the manufacturing and roof fastening processes. The combination of the broad area of coverage of the membrane with the multi-point load transfer function provided by the touch fastener interface between the reinforcing membrane 24 and the underside of the roofing membrane 16 is of particular advantage, due at least in part to the ability of the touch fastener interface to maintain a significant load resistance while absorbing significant relative displacement at the interface, such as may be induced by extreme load conditions at discrete deck fasteners. Preferably, reinforcing membrane 24 covers at least 80 percent (better still, at least 90 percent) of the area of one face of the insulation board. Most preferably, reinforcing membrane 24 covers the entire (or substantially entire) broad surface of the insulation board. Membranes that span substantially the full width and length of the board as a single, continuous substrate are preferred, as opposed to areas covered by discrete, adjoining strips, although single continuous membranes covering at least half of both the width and length of the board are useful. For example, for a 4 by 8 foot (1.2×2.4 m) board, a reinforcing membrane of at least 24 inches (60 cm) in width, 48 inches (1.2 m) in length is preferred. Roof deck fasteners and associated washers, if employed (see FIG. 3) will cover discrete regions of the touch fasteners, but care should be taken to maintain the availability of the fastener elements over a substantial portion of the surface of the board so as to obtain a maximum amount of the securement and reinforcement effects of the membrane.

Referring back to FIG. 3, by means of illustration only, a high wind velocity can create a very low roof surface pressure, approaching an absolute vacuum. Simultaneously, high pressures can be developed within the roof, under the foam insulation boards 14. That relatively high pressure can be transferred to the interface between insulation 14 and membrane 16 by air flow at the edges of adjacent boards, or along the threaded fasteners. High pressure loads reaching the insulation-membrane interface via fastener 18 will, due to the limited air-permeability of the touch fastener interface, be controllably distributed away from washer 20 to place the entire interface in tension, rather than acting at an edge of an adhesive insulation-membrane interface around fastener 18 and progressively failing the adhesive bond. The touch fastener interface enables local and small relative displacement of the roofing membrane 16 with respect to the rigid underlayment, allowing the membrane to move to distribute localized loads that would otherwise cause local failure. Across the insulation, even under washer 20 where the fastener elements are inoperable, the presence of membrane 24 reinforces the foam substrate. Furthermore, it is believed that load cycles may even increase the strength of the touch fastener interface, due to minute displacements that occur across the fastener field and enhance engagement between great numbers of hooks and loops. Such engagement enhancement may also result from thermal expansion cycling. Such effects may actually improve the strength of the roof over time.

In some examples, the hooks of hook membrane 24 are preferably configured with sufficient column strength, hook density and height to resist crushing from foot traffic, installation or other forces. Increased lateral column strength may be provided by shorter, thicker, and more closely arranged hooks believed to be desirable in certain high traffic or heavy load applications. A short mushroom-style hook is believed to be well suited to such applications. An example of a mushroom-style hook is the 3M brand SJ3506 hook product.

In one example hook membrane 24 is formed of polypropylene, and has a hook density of about 1700 hooks per square inch (265 per square cm). The hooks themselves extend about 0.015 inch (0.4 mm) from the face of the membrane, which is about 0.005 to 0.006 inch (0.13 to 0.15 mm) thick, exclusive of the fastener elements. These relatively shorter, sturdier hooks and high hook densities are considered advantageous in avoiding damage from foot traffic during roof construction, particularly before the roof membrane is installed.

Figure 6:
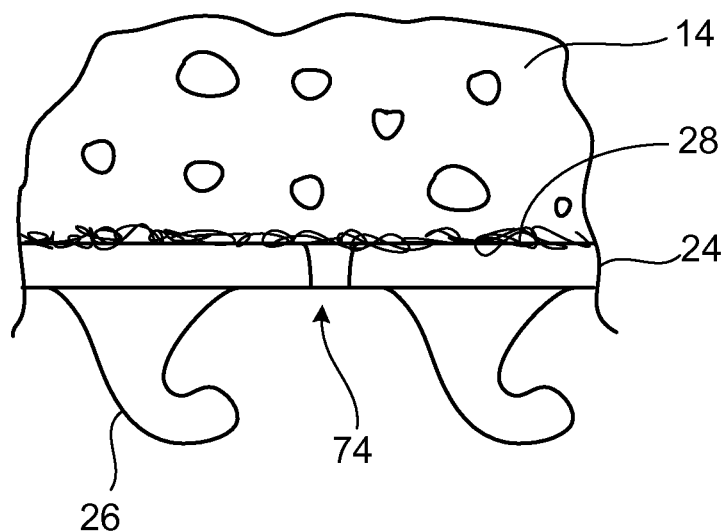
FIG. 6 is an enlarged cross-sectional view showing a reinforced board-membrane interface.

To further increase the reinforcement properties of the membrane, membrane 24 is itself reinforced with a very light non-woven fabric. Such fabrics, and methods of making them, are disclosed in pending U.S. application Ser. Nos. 10/728,138 (published as US2004/0157036A1) and 11/102,455 (published as US2005/0196580A1), the contents of both of which are hereby incorporated by reference. Such reinforcing fabrics can be directly laminated into the resin of the membrane as the membrane is being formed, by the methods taught in U.S. Pat. No. 5,518,795, for example, the contents of which are also incorporated herein by reference. As shown in FIG. 6, the reinforcing fabric 28 may be embedded in the back surface of the resin membrane 24 and exposed for securing the membrane either directly to the foam 14 (as shown in FIG. 6) or to an intermediate tie layer, such as an adhesive. For enhancing the bonding of the reinforcing fabric directly to urethane-based foam, for example, a urethane binder coat may be employed in the construction of the fabric. The membrane may alternatively be formed with hooks or other protrusions on both sides, or may have its back surface formed by a urethane-based resin (as in a co-extrusion process) or coated with a urethane or tie layer of suitable material. Co-extrusion methods are taught in U.S. Pat. No. 6,540,863, also incorporated herein by reference.

Methods of securing the membrane directly to the foam are discussed in more detail below.

In the construction shown in FIG. 5, the membrane 24 is adhesively laminated to a reinforcing material 30 (such as glass reinforced felt material or Kraft paper, for example) that is either directly or adhesively bonded to the foam. Aluminum foil may also be employed, as a vapor barrier. The other side of the foam board of FIG. 5 is shown with a standard paper skin 32.

Referring back to FIG. 4, the side of insulation board 22 opposite the reinforcing membrane 24 may also be provided with touch fasteners, for securing the board to the roof deck. These board-deck touch fasteners 33 may be of a different shape, density and material than those of membrane 24, and may be arranged to either cover the entire (or substantially entire) surface to provide additional reinforcement, or arranged in spaced-apart strips 34 as shown. Such strips may be provided only where the board will engage upper lands of a corrugated roof deck, for example. In this example, the hook strips 34 are shown extending across the width of the board, each having a width of about three inches (75 mm). Securing the insulation boards to the roof deck with touch fasteners eliminates holes, fastener corrosion and pull out failure modes. This may also enable lighter roof deck steel gauges, with reinforcements necessary only at bar joists, by distributing fastener loads more uniformly across the decking and eliminating screw pull out concerns.

Alternatively or additionally, in some installations, hot asphalt or adhesives such as urethane can be used to secure the foam boards to the roof deck structure.

In some implementations, a combination of touch fasteners and adhesive can be used to secure the roofing membrane to the foam boards. For example, in any of the touch fastener configurations disclosed herein, an adhesive can be applied between the touch fastener materials in particular areas, such as at roofing corners and edges, to further secure the fastening against separation.

In other cases, adhesive can substitute for touch fasteners in some regions. For example, adhesive can be used to adhere loop material present on the back of the roofing membrane to conventional foam boards along a roof edge portion, while engagement of the loop material of the roofing membrane with hook fastener material across foam boards in a central roof region. Thus, the loop fastener material present on the back of the roofing membrane can provide a suitable surface and structure for touch fastener engagement and/or adhesion.

Loop touch fastener materials, such as a non-woven loop material, can be laminated to the roofing membrane to serve as a tie layer for attachment cement. Suitable loop materials are found on "Fleece-back" materials available from Carlisle SynTec Incorporated and Sika-Sarnafil Inc. These loop materials can be needled felts that use PET staple fibers of approximately 3 in. (76 mm) long by 3 to 6 denier, typically with crimp. Such materials can be produced in 2-6 oz. per square yard (70-200 gsm) weights. In a particular application, the loop touch fastener material is a Velcro USA Inc. loop product characterize by 3 inch (75 mm) crimped staple fibers of 3.5 denier PET of about 3.3+/−0.5 oz. per square yard (110+/−15 gsm). The loop material can be stabilized and rolled onto and adhered to the roofing membrane. In other implementations, a similar loop material and application process can be used to provide the loop fastener material on the foam board.

In other implementations, the loop touch fastener material can include knit constructions such as warp knit constructions. Examples of such materials include yarns of Nylon 40 denier with about 9 to 13 filaments and 3-7 grams per denier tenacity for the pile and ground. A suitable binder coating for use with the knit construction is Sancure 1004-4B at 2.6 oz. per square yard (88 gsm).

In some implementations, the hook and loop touch fastener materials orientations are selected such that the hook material is present on the back of the roofing membrane and the loop material or a self-engaging hook material is present on the foam board facing.

In a particular implementation, a tie layer of Velcro brand FNL-300 nonwoven loop can be fed into an insitu lamination process during formation of the hooks, similar to the process used to produce the Velcro brand Onewrap® product. The resulting dual hook-loop backed product can then be laminated to the roofing membrane by insitu or glue lamination of the loop side of the material to the roofing membrane. For example, a PVC membrane can be cast over the loop fastener side to produce a roofing membrane bearing a hook touch fastener material. A complementary loop fastener material is laminated to the foam insulation board or other suitable underlayment. One suitable loop material is a nylon warp knit loop material.

In another particular implementation, hook fastener elements and/or a hook base are calendared or extruded directly onto the roofing membrane. A preformed roofing membrane is passed through a nip between the mold rollers and a hook resin is applied to the membrane at the nip. The applied resin is forced into hook shaped cavities on a mold roll and the roofing membrane with the formed hooks is stripped from the mold roll. Sections of roofing membrane can be glued or welded together to produce larger membrane panels.

Wider hook panels can also be formed by laterally stretching molded or extruded hook tape, such as is discussed in U.S. Pat. No. 6,035,498, the entire contents of which are incorporated herein by reference. A relatively thick layer of resin with integrally formed hooks can be formed on, or adhered to, a relatively thick sheet of roofing membrane and the two laterally stretched together to form a hook-bearing membrane of greater width.

Figure 7:
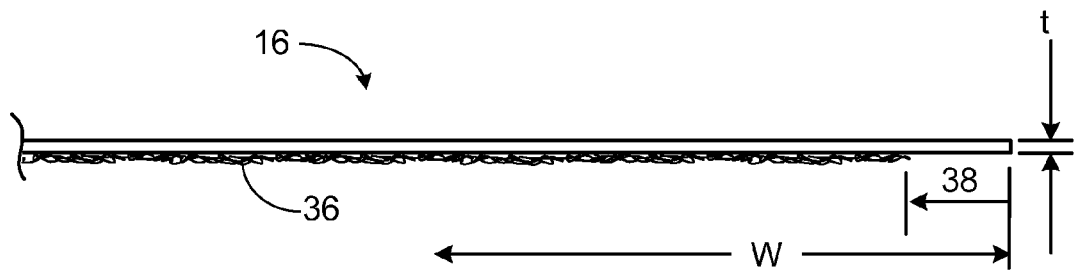
FIG. 7 is a side view of one end of a roofing membrane sheet.

Referring next to FIG. 7, membrane 16 is a continuous sheet of EPDM of uniform thickness 't' having a standard width 'W' of, for example, 2 meters, 3 meters, 8 feet (2.4 m) or 10 feet (3 m) and continuous (roll) length. PVC is another suitable membrane material. The underside of membrane 16 features a loop material 36 that extends across all but a weld region 38 about three inches (75 mm) wide along one edge of the membrane. The loop material is Velcro USA loop 3905, a nylon knit material with a fairly closed ground. Other useful loop materials include non-woven materials, such as those disclosed in US2004/0157036A1. The back side of the loop material may be coated with a urethane, for example, to bond to a PVC membrane. Other useful loop-backed membranes include FLEECEBACK™, available from Carlisle SynTec Incorporated of Carlisle, Pa., and typically installed by expanding a urethane adhesive between the insulation board and the membrane.

Figure 8A:
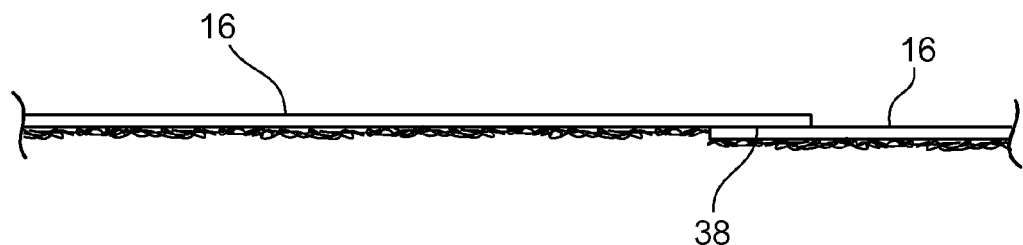
FIG. 8A shows an overlapped roofing membrane joint.
Figure 8B:
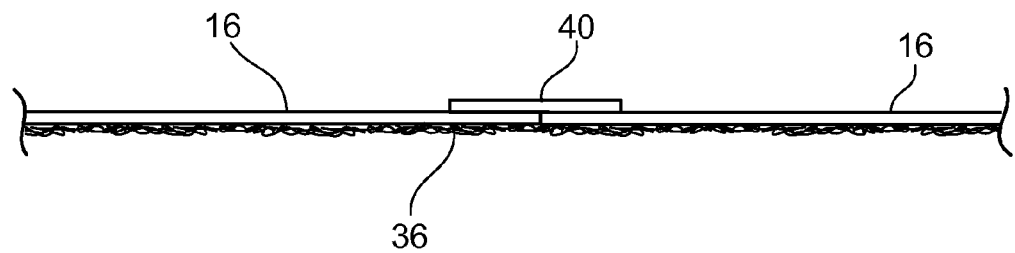
FIG. 8B shows a roofing membrane butt joint with an overlapping joint cover.

As shown in FIG. 8A, in a roofing application adjacent lengths of membrane 16 are overlapped, with the weld region 38 of the upper length extending over the adjacent length, such that the membrane substrate material (e.g., PVC) surfaces are in direct face-to-face contact for heat or solvent welding or adhesion. Alternatively, as shown in FIG. 8B, the loop material 36 may extend over the entire width of each length of membrane, with adjacent lengths of membrane 16 butt-spliced at a joint covered by a bare strip 40 of membrane material.

In some applications, membrane 16 is installed on roof surfaces of different heights, with membrane 16 extending up vertical or inclined surfaces between the different roof sections. For example, membrane 16 can extend up a wall or over a vertical divider between different roof sections. Thus, membrane 16 can be installed on horizontal, arched, inclined and even vertical or other contoured surfaces.

Portions of membrane 16 can be configured with graphics to provide aerially viewed advertising, for example, on single story buildings among office towers or along lower flight paths near airports. These portions can be configured to be removable and exchangeable to update the graphics appearing on the roofing installation.

Figure 9:
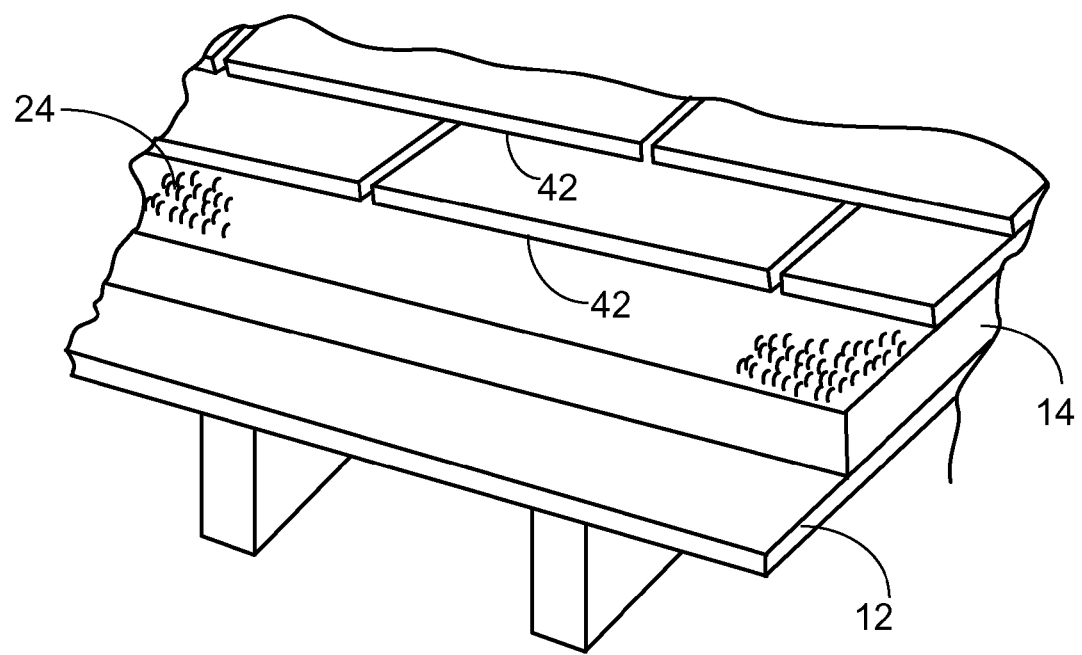
FIG. 9 is a perspective view of a partially constructed shingle roof.
Figure 9A:
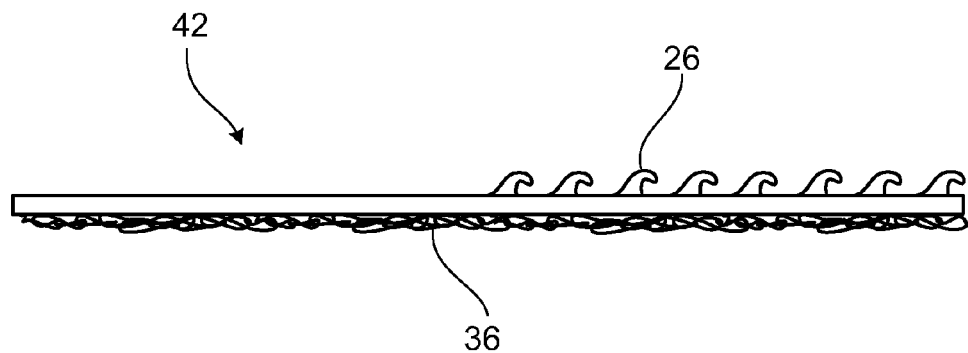
FIG. 9A is a side view of one of the shingles of FIG. 9.

Referring next to FIG. 9, another roofing construction features a pitched wooden roof deck 12, such as of plywood, to which the above-described reinforced insulation board 14 is secured, either by adhesive or by touch fasteners (e.g., by providing the underside of board 14 with hooking fasteners as discussed above, and adhering a lightweight loop material to the upper surface of the roof deck). Shingles 42 are then individually secured over the insulation in a typical overlapping pattern, beginning from a lower edge of the roof deck. As shown in FIG. 9A, each shingle 42 has loop material 36 across its underside, and a patch of male fastener elements 26 on a portion of its upper surface to be overlapped by a later-placed run of shingles. Preferably, the shingle is constructed to be particularly flexible, to enable loads to be distributed throughout the touch fastener interfaces under load conditions.

Figure 10:
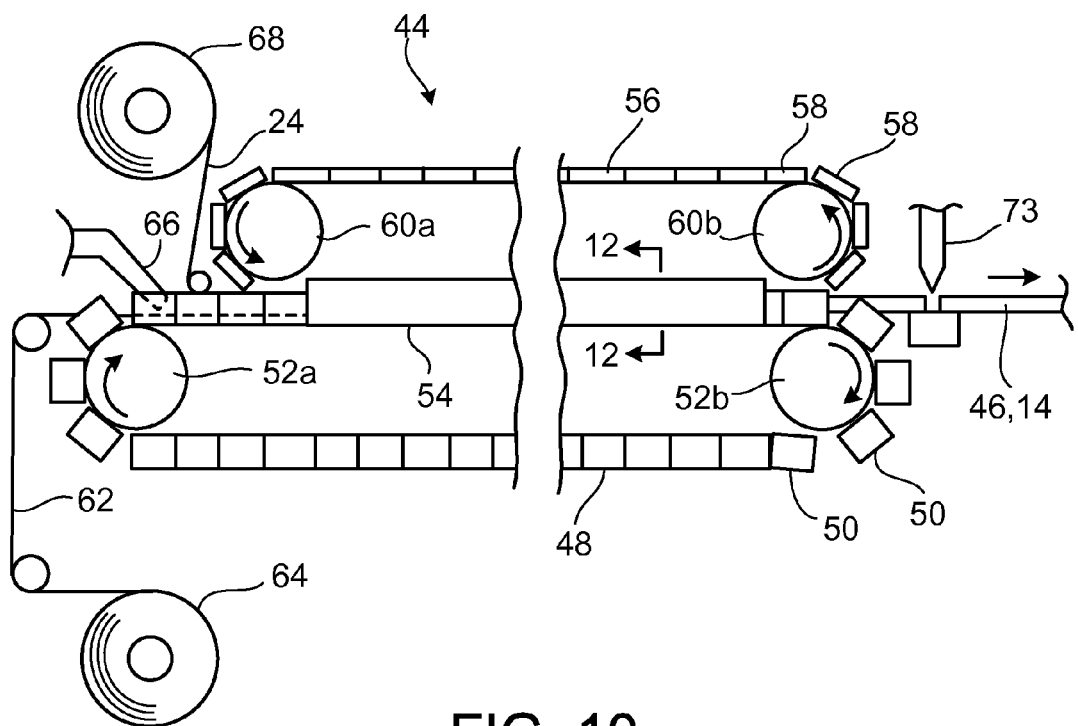
FIG. 10 illustrates an apparatus and method for forming reinforced construction underlayment boards.
Figure 12:
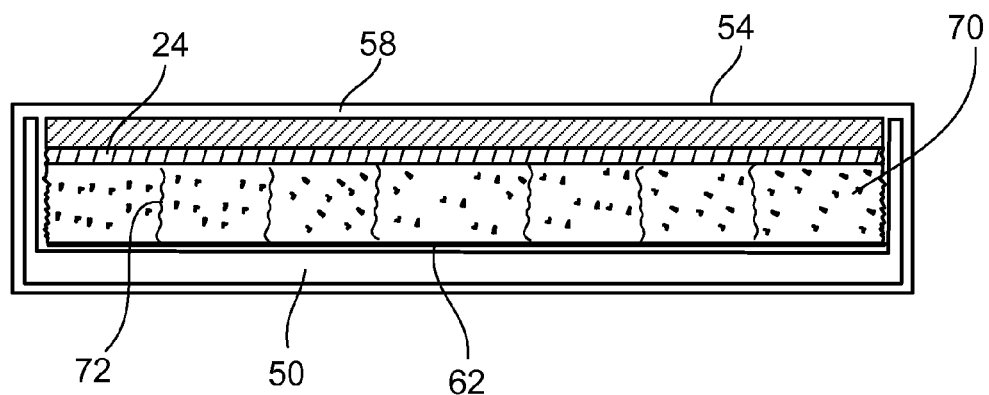
FIG. 12 is a cross-sectional view taken along line 12-12 in FIG. 10.

Referring next to FIGS. 10 and 12, an apparatus 44 for producing faced foam boards 46 includes an articulated, segmented chain 48 of U-shaped lower channel segments 50 driven about two rollers 52a and 52b. Chain 48 is configured such that end surfaces of adjacent segments 50 meet and are held together during the straight run of chain 48 that passes through heater 54, in which chain 48 forms a moving U-shaped channel. An upper chain 56 of flat plate segments 58 is driven about two rollers 60a and 60b and also moves through heater 54 with end surfaces of plate segments 58 held together to form a moving continuous plate. As the segments of the two moving chains are brought together prior to entering heater 54, plate segments 58 of the upper chain nest within channel segments 50 of the lower chain, such that the moving segmented chains define a moving channel within heater 54, as shown in FIG. 12. The side edges of plate segments 58 may seal against the inner surfaces of channel segments 50, or may have a small running clearance. Within heater 54 the moving chain segments are restrained against vertical separation by inside surfaces of the heater housing.

Figure 11:
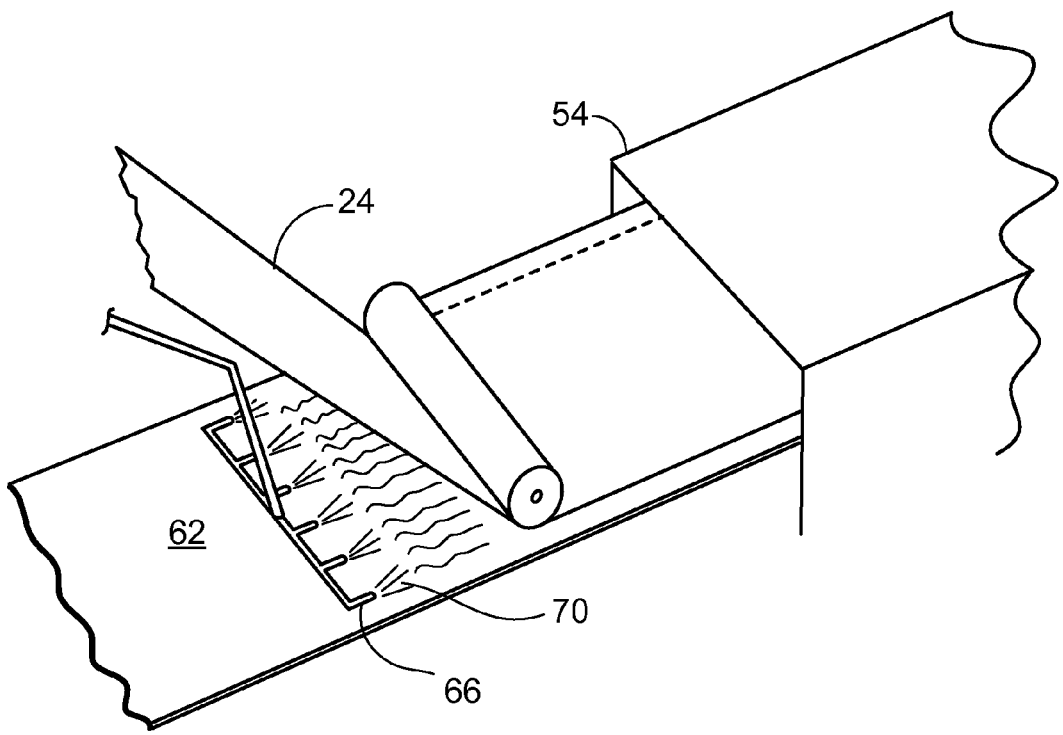
FIG. 11 is a perspective view of the portion of the apparatus of FIG. 10 preceding the heater entrance, showing the application of foaming resin, but with the moving chain segments removed for clarity.

Still referring to FIG. 10, a continuous sheet of facing material 62 (such as the paper skin 32 of FIG. 5) is introduced from roll 64 to the moving channel, disposed against and substantially covering the lower inner surface of channel segments 50. Onto this facing material a liquid foaming resin is sprayed by nozzle 66, distributed across the width of the facing material. The foaming resin 70 may be applied with multiple individual nozzle heads, as shown in FIG. 11. Above the sprayed foaming resin, reinforcing membrane 24 is introduced to the forming channel as a continuous length from roll 68, to become a reinforcing facing on the resulting product. A method of continuously producing an insulation board is disclosed in U.S. Pat. No. 4,572,865, which is incorporated herein in its entirety by reference.

As supplied to the channel, membrane 24 may already be laminated, either adhesively or directly, to a reinforcing or barrier material, such as a paper, fabric, film or foil backing. Membrane 24 is provided with molded male touch fastener elements (not shown in these views) extending from its upper surface, away from the foaming resin. Alternatively, a reinforcing facing of woven or knit or otherwise formed touch fastener material may be used. In reinforcing backings with layers having discrete fibers, such fibers may be selectively oriented to extend in directions corresponding to forces induced by roof loading, particularly with respect to fastening bolt locations.

Figure 13:
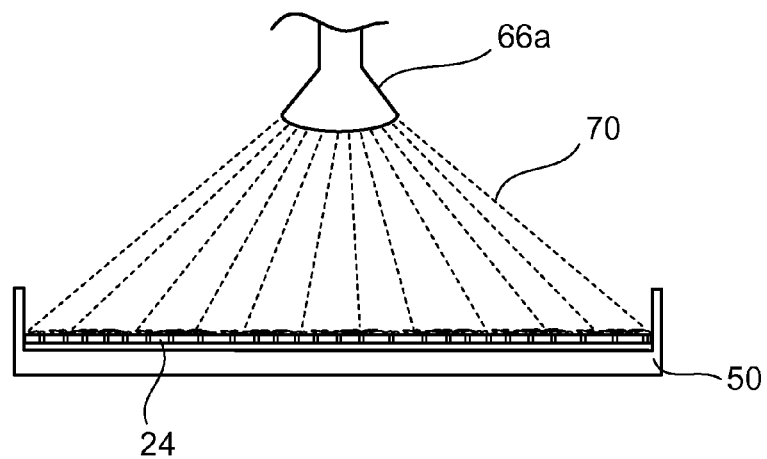
FIG. 13 illustrates another foaming resin spray pattern and apparatus.

FIG. 13 shows that the lower facing material may also be in the form of a sheet-form touch fastener material, such as another hook-bearing resin membrane 24, onto which the foaming resin 70 is sprayed. FIG. 13 also shows resin 70 being applied by a single nozzle head 66a that applies a fan-shaped single spray pattern of resin that extends essentially across the width of the channel.

In other cases, hook-bearing resin membrane 24 and foaming resin 70 are coextruded to form a laminate. In other cases, the hook bearing resin membrane 24 is extruded onto the foam board panel as described in U.S. Pat. Pub. No. US 2007-0264482 A1, which is incorporated herein in its entirety by reference.

In one configuration, the resulting foam panel is reversible in that a hook-bearing resin membrane 24 is present on both sides of the panel. Alternatively, loop material may be provided on one side of the panel. Accordingly, the foam panels may be secured to the corrugated roof structure using complimentary fastener elements adhered to or formed on the corrugated roof structure.

Referring back to FIG. 12, as the materials progress through heater 54, foaming resin 70 expands to essentially fill the channel, pressing reinforcing membrane 24 up against segments 54 and bonding to the facing materials. The inner surfaces of the moving channel segments may be treated or coated so as to inhibit foam adhesion to the channels. As the resin foams and expands in thickness, vertical knit lines 72 can form between adjacent flows of resin. These knit lines can extend through the thickness of the foam and form regions of reduced board strength. Membrane 24 extends across these knit lines and reinforces the board against rupture and splitting.

Referring back to FIG. 10, the foamed resin and bonded facing materials exit heater 54 as a continuous, rigid laminate structure that can be severed into discrete boards 46, such as by a blade 73.

In some cases, the molding channel is a substantially closed tube as previously described. In other cases, the molding channel is a substantially open corridor such as a single conveyor belt. Still in other cases, the molding channel is an open faced trench, for example, formed by just the lower portion of the channel illustrated in FIG. 12. Accordingly, the foam can be molded using a free rise process on a single conveyor or open faced trench, or using a restrained rise process as illustrated in FIG. 12.

It can be particularly advantageous to inhibit gas bubble nucleation or growth at the interface between the foaming resin and the facing materials during foaming, as extensive surface bubble growth can weaken the bond between the foam and facing materials. One approach to reducing bubble growth on the back side of the facing materials, such as membrane 24, is to make the foam-side of the facing smooth. In this way, foam is less prevented from lateral displacement across the face of the foam as bubbles form, and less likely for incompletely foamed resin to be stagnated. For facing materials having molded resin base membranes, the membrane base may be provided with a smooth back surface as molded. Alternatively, such smoothness may be provided by coating a facing material having a non-smooth (e.g., knit or woven fabric) base with a layer of resin or by laminating such a base to a smooth film. Coatings may be employed that enhance bonding strength to the foamed resin. Another approach to reducing bubble growth is to provide the back surface of the facing material with surface features, such as small exposed fibers, that inhibit contiguous bubble growth beyond a certain size. Yet another approach is to provide the base of the facing material with small holes or perforations, such as hole 74 shown in FIG. 6, or a porosity, that vents forming gases through the facing material without allowing the foaming resin to pass completely through the facing materials in quantities that would foul the exposed fastening elements.

Figure 14:
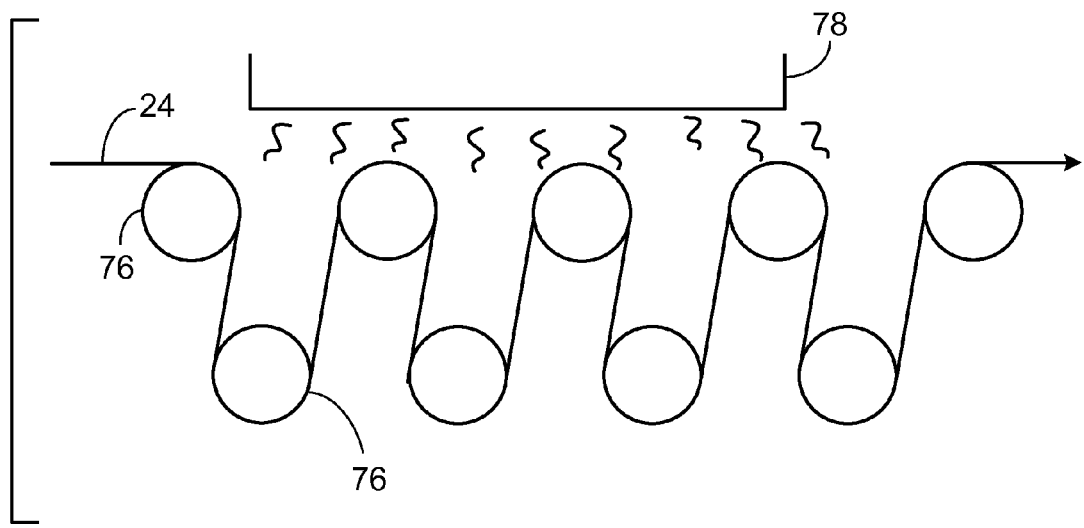
FIG. 14 illustrates an apparatus and method for annealing a continuous resin membrane.

When employing a reinforcing membrane 24 formed as a continuous sheet of resin, significant shrinkage of the resin, such as can occur in heater 54, in shipping or as installed, can result in undesirable board warpage. In such instances, the opposite side of the board can be provided with a reinforcing membrane of similar shrinkage properties, such as a membrane of identical material and thickness. Shrinkage may also be reduced by annealing of the membrane resin prior to lamination. One apparatus and method for controlled annealing of a continuous hook membrane is shown in FIG. 14. The formed hook membrane 24 is trained about a series of rollers 76 adjacent a radiant heater 78. The rollers include dancers that apply a controlled tension to the hook tape as it undergoes a series of bending reversals while being heated, effectively annealing the base of the hook membrane. The touch fastener elements, not shown in this figure, are disposed on the side of the membrane facing away from heater 78, such that radiant heat is applied to the back, non-fastening surface of the membrane. To promote annealing, the membrane may be vibrated during the annealing process, such as by vibrating one or more of the rollers or applying a fluttering air flow to the membrane. The applied tension may even be selected to be sufficient, in some cases, to yield the resin of the membrane base.

Other means for controlling board warpage include providing warp-resisting structural elements, either within the foam layer, within the reinforcing facing, or between the foam and facing. For example, a rigid wire grid may be employed as an additional reinforcement, either within the foam (as rebar within concrete) or in or adjacent the reinforcing facing material.

Other foaming resins, such as polystyrene, may be employed that generate lower amounts of heat during foaming and thus may result in less warpage. Such resins can be extruded, injected or poured into a molding space.

Figure 15A:
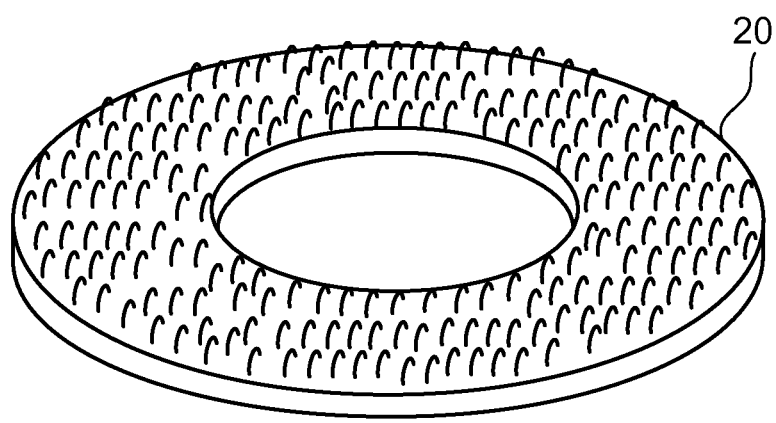
FIG. 15A is perspective view of a washer having fastener elements.
Figure 15B:
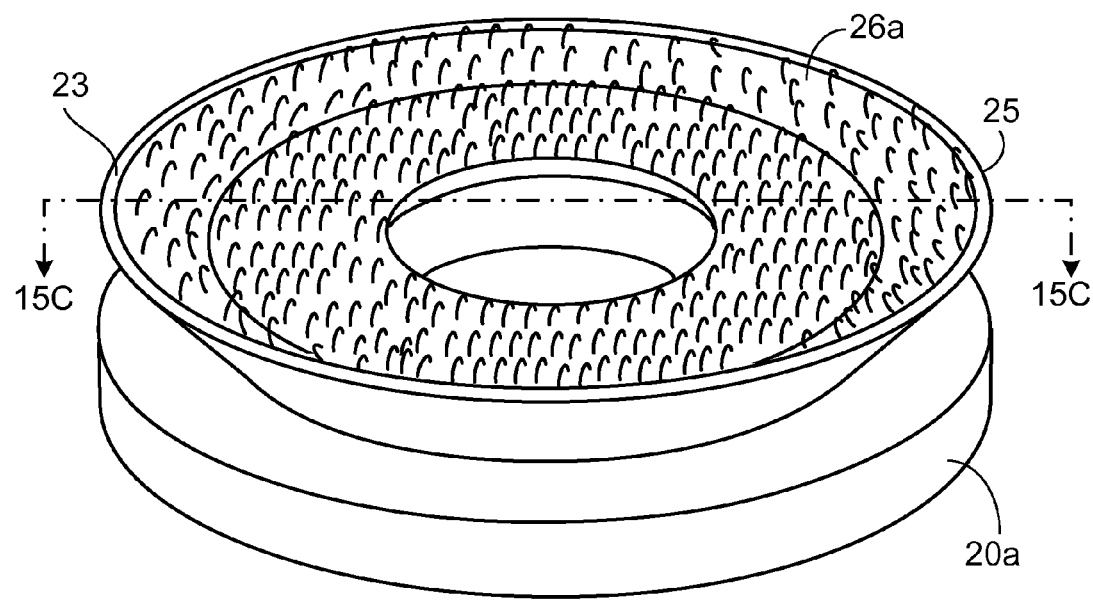
FIG. 15B is a perspective view of a washer having fastener elements and a peripheral anti-peel flap.
Figure 15C:
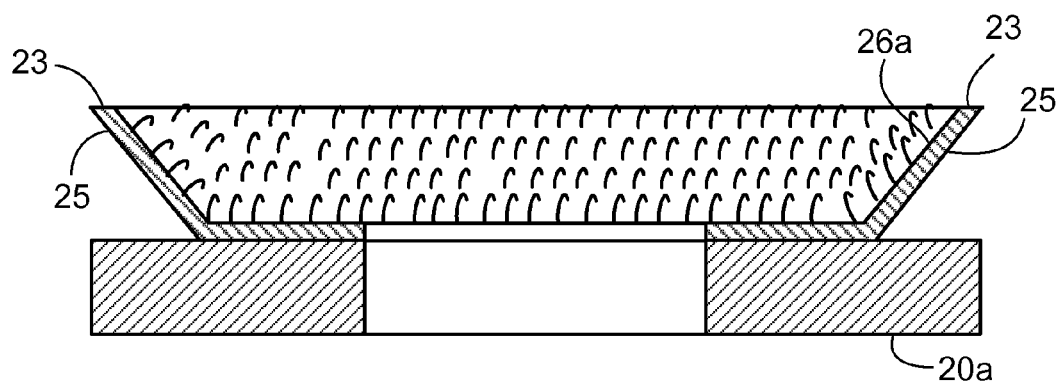
FIG. 15C is a cross-sectional view of a washer having a peripheral anti-peel flap, taken along line 15C-15C in FIG. 15B.

With reference to FIGS. 15A-15C, washers 20, 20a are configured to prevent pull-through or tear-out of fasteners 18 (see FIGS. 1 and 3) during uplift of membrane 16 during high winds. Accordingly, washers 20, 20a are configured in part as a function of the thickness and strength of the foam layer and the anticipated uplift forces. Washers 20 are said to have 'anti-peel' flaps in that the fastener element base is unrestrained near the edge of the washer to form a flap that can flex in response to a peel load, so as to place the fastener elements carried on the flap in a shear-resisting orientation.

Washers 20 and 20a are configured as rigid annular screw plates covered with male fastener elements 26a similar to those carried by reinforcing membrane 24. While male fastener elements 26a of washers 20 need not be the same as male fasteners 26 of membrane 24, continuity of male fastener elements 26 and 26a across membrane 24 and washer 20, 20a is believed to provide more uniform stress distribution. Relatively small stress points adjacent washers 20 where peel may be initiated during uplift may be reduced by inclusion of male fastener elements across the top face of washer 20, 20a. Such stress reduction may be particularly useful near the perimeter and corner sections of membrane roofing installations.

For example, washers 20 with fasteners 18 can be arranged in a dense pattern near corners and edges and in a less dense pattern in the central field area of the roof. Similarly, washers 20 may be limited to use at the edges or corners where peel forces are strongest. In some applications, fasteners elements 26a on washer 20a may be sufficient to secure a portion of membrane 16, without the need for fastener elements 26 in an adjacent region of the underlayment 14. This would essentially transfer any uplift forces in the field through fastener 18 to the underpinning roof structure, rather than to the foam boards.

It has been determined that male fastener elements 26a can be provided on a two-three inch (5.1-7.6 cm) washer 20. Male fastener elements 26a may be uniformly aligned across washer 20 such that the hook portions of elements 26a all face the same direction. Alternatively, male fastener elements 26, 26a may be circumferentially aligned such that the hook portions are radially arranged to provide increased shear resistance.

It has been determined that fastener elements 26a can be provided on a three inch (7.62 cm) washer 20a using a 0.25-0.50 inch (0.64-1.27 cm) flap 25 about the peripheral portion of washer 20a.

Still in other implementations, it is advantageous for hook elements 26a to be uniformly oriented radially inward over the washer interior portion to resist separation nucleation at the center of washer 20a. It can be further advantageous to have the hook elements 26a uniformly oriented radially outward to better resist shear separation. Thus, fastener elements 26a may be uniformly oriented outwardly, inwardly or may be varied in oriented for a given application.

With reference to FIG. 15B and the cross-sectional view of FIG. 15C taken along line 15C-15C in FIG. 15B, one implementation of washer 20a includes an anti-peel perimeter flap 25. Flap 25 is formed from a free peripheral section of the polymer base 23 that is common to male fastener elements 26a. Flap 25 is effectively hinged about an inner perimeter where a central portion of base 23 is attached to washer 20a. Membrane 24 experiences tensile forces during uplift or expansion and flap 25 flexes upward to provide an anti-peel or shear transition region as the flap flexes to better align with the tensile forces in membrane 24. Thus, flap 25 provides washers 20a with increased peel resistance during uplift loading on membrane 24. Washers 20a can be formed from stamped metal or by injection molding of plastic. Fastener elements 26a may be applied to washer 20a before or after separation of washer 20a from a bulk precursor material or before or after installation of washer 20a on screw fasteners 18. In one example, fasteners 26a are adhered or molded onto a precursor metal plate from which washers 20a are to be stamped. A stamp die having a cavity or clearance to accommodate fasteners 26a on the precursor metal plate is then employed to stamp washers 20a from the metal plate. Washers 20a may be stamped in the form of an annulus, oval, rectangle, polygon or other suitable shape before or after application of fasteners 26a to washer 20a. Continuously curved shapes such as circles or ovals are preferred in some applications to minimize stress concentrations. Washer 20a may be flat, concave or convex before or after installation for a given application. Addition of fine wires or creation of metal burrs or stamped projections on washer 20a can provide loop engaging structures on washers 20a.

In insert injection molded washer implementations having flap 25, a mask insert or release agent is first applied to the washer in the peripheral section of the washer, to prevent fastener resin from bonding with washer material in the peripheral section. The release agent may be a overprint varnish, for example, as described in U.S. Pat. No. 7,056,462. The release agent may be selected to cause only modest adhesion between washer and fastener resin, such that flap 25 is initially secured to the washer face until subjected to a peeling load that is less than the peel strength of the fastener elements but sufficient to delaminate the flap from the washer face.

For example, for a three inch (7.62 cm) washer 20a, the pressure sensitive adhesive is applied to the peripheral 0.25-0.50 inch (0.64-1.27 cm) portion of washer 20a. The pressure sensitive adhesive is sufficiently strong to retain flap 25 against washer 20a in the absence of a peel force. The pressure sensitive adhesive reattaches flap 25 to washer 20a upon removal of the peel force and return of flap 25 adjacent washer 20a. Releasable attachment of flap 25 provides for easy of storage, shipping and installation of washer 20a and preserves flaps 25 against deformation. Reattachment of flaps 25 by the pressure sensitive adhesive prevents build up of dirt or moisture under flaps 25.

Figure 16A:
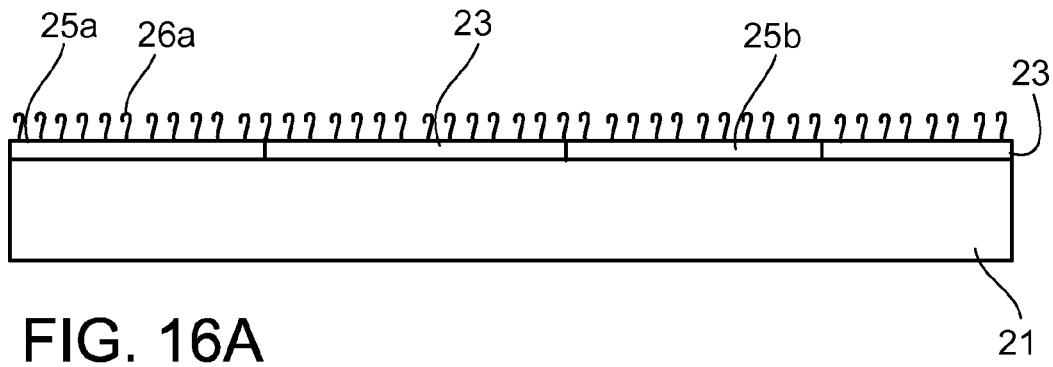
FIG. 16A is a side view of a rigid substrate having anti-peel flaps in a first no load position.
Figure 16B:
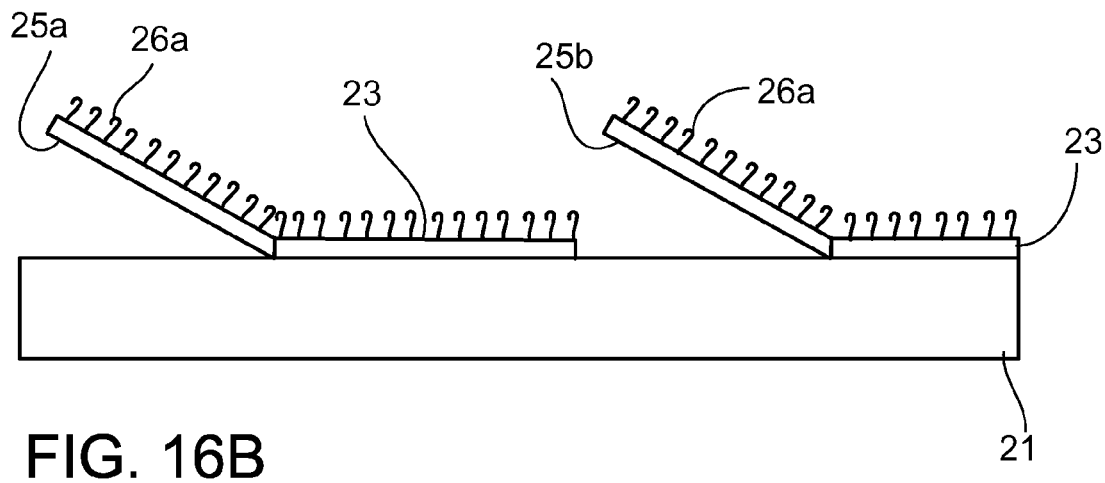
FIG. 16B is a side view of a rigid substrate having anti-peel flaps in a second loaded position.

With reference to FIGS. 16A-16B, one implementation of an anti-peel feature includes a flap 25a, 25b that is initially adhered, laminated or otherwise bonded to a rigid substrate 21, and is subsequently separated or released from rigid substrate 21 when subjected to a predetermined peel force. Substrate 21 may be a washer, such as washer 20, 20a, a metal or plastic plate or other rigid or semi-rigid substrate. In one implementation, a pressure sensitive adhesive is used to bond flap 25a, 25b to rigid substrate 21. The pressure sensitive adhesive is applied to the area of rigid substrate 21 from which flap 25a, 25b is to be released. A more permanent adhesive or bond is employed to bond the remainder of base 23 of fastener elements 26a to rigid substrate 21.

A second anti-peel flap 25b on rigid substrate 21 is configured to release on the interior rather than periphery of rigid substrate 21. For example, a release agent is provided on rigid substrate 21 below flap 25b and base 23 of fastener elements 26a is perforated or die cut along an interior portion of substrate 21. Thus, any number of flaps 25a, 25b may be used on substrate 21 to provide anti-peel resistance in multiple directions or across any desired portion of substrate 21.

Figure 16C:
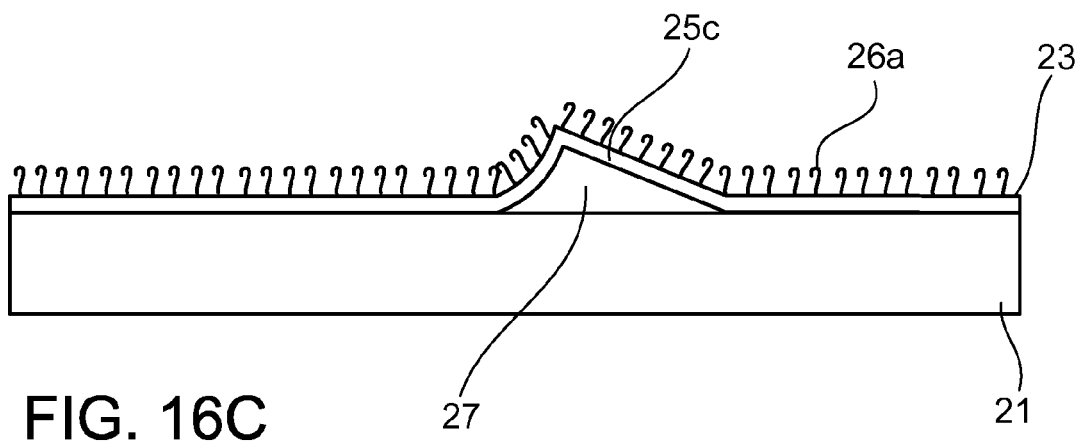
FIG. 16C is a side view of a rigid substrate having a partially releasable anti-peel flap in a loaded position.

In another implementation shown in FIG. 16C, flap 25c is stretchable and is unbonded or releasable from rigid substrate 21 about a central flap area 27 to provide anti-peel resistance in multiple directions. Flap 25c may be configured with an elongated open ended, or closed ended, e.g., circular, unbonded central area 27. An elongated unbonded area provides bi-directional anti-peel resistance while a circular unbonded area provides omni-directional anti-peel resistance.

Flaps 25, 25a, 25b, 25c need not be of uniform width, thickness or hook/loop density but may be varied for a given application. In some applications, it may be advantageous to switch the respective hook and loop fastener element positioning on roofing membrane 16 and washer 20. The pressure sensitive adhesive or other bonding means may be provided on substrate 21 and/or flaps 25a-c. Flaps 25a-c are configured to be releasable or unbonded relative to substrate 21 employing any number of release agents, mold inserts, temporary adhesives, pressure sensitive adhesives, substrate surface treatments, mechanical peeling or other separation or release mechanism.

Figure 17:
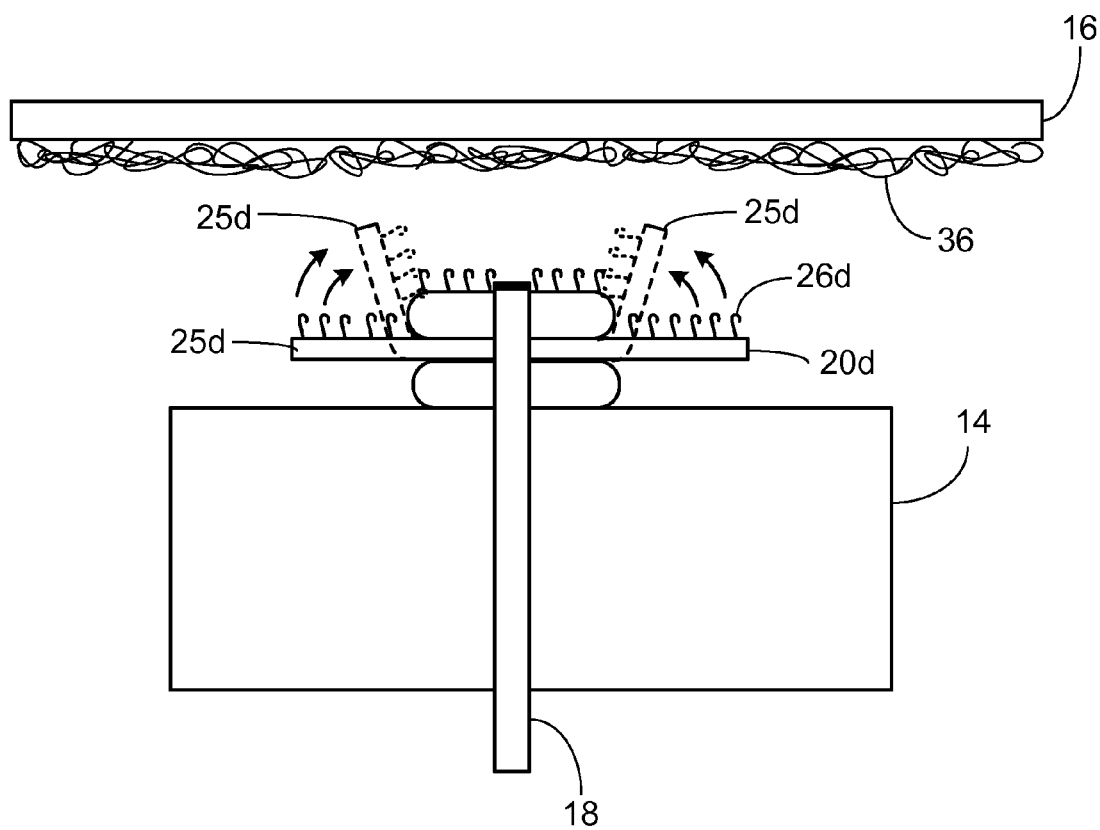
FIG. 17 is a side view of a washer having flexible anti-peel portions.

With reference to FIG. 17, a washer plate 20*d* includes flexible peripheral portions 25*d* carrying touch fastener elements 26*d*. Washer plate 20*d* and fastener 18 tie foam board 14 to the roof deck. Touch fastener elements 26*d* are configured to engage cooperating touch fastener material 36 present on the underside of roof membrane 16. In some cases, touch fastener elements 26*d* are hooks insitu molded on a flap or other suitably flexible peripheral portion 25*d* of washer plate 20*d*.

In some cases, fastener elements 26*d* comprise reinforced plastic hook laminate material fixed to, e.g., glued to, washer 20*d* or other suitable screw plate or broad faced distributive plate. Washers 20*d* with fastener elements 26*d* are placed hook up on foam board insulation panels 14. Washers 20*d* can be used in higher number and densities in roof corners and lower densities in the roof field. A screw is inserted thru the center hole of washer 20*d* and is driven thru the insulation panel and into the roof deck.

A fleece backed membrane 16 is rolled out over foam board insulation panels 14 and washers 20*d*. The assembly is then rolled or broomed to promote engagement of fastener elements 26*d* and fleece 36. The flexible peripheral portions 25*d* flex upward during up-lift loading to follow the curvature of the membrane as the portions of membrane between washers 20*d* lifts, thereby maintaining the engagement between membrane 16 and fastener elements 26*d* in a shear mode for improved load resistance. Flexure of the peripheral washer portion 25*d* allows the touch fastener closure to flex and remain engaged during membrane distortion from up-lift loading. The touch fastening can generally resist greater overall loads in sheer compared to what are known in the touch fastener industry as peel or tension loading orientations. Moreover, the touch fastener closure between washer 20*d* and membrane 16 is anchored directly to the roof decking, providing superior strength even to touch fastener closures between foam board 14 and membrane 16. In some cases, washers 20*d* can provide the sole touch fastener closure or attachment of membrane 16 to the roof.

Figure 18:
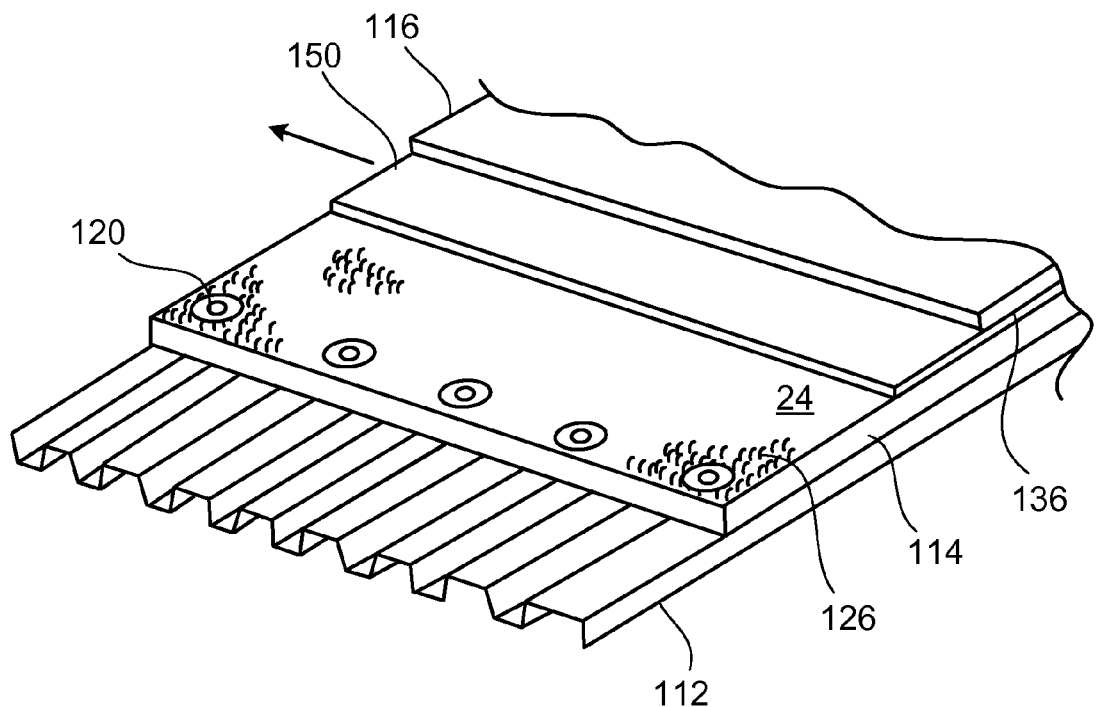
FIG. 18 is a perspective view of installation of a membrane roof.

With reference to FIG. 18, one application features a method of installing a roofing structure including securing a foam board underlayment 114 to a roof deck 112 with fasteners 120. Underlayment 114 includes rigid foam boards having a flexible resin reinforcing membrane 124 bonded across an upper surface of underlayment 114 and carrying an array of male fastener elements 126 having stems formed of the flexible resin. A flexible roof membrane 116 is positioned to extend over underlayment 114 and flexible roof membrane 116 is a water-impervious sheet with a field of fastener elements 136 exposed on an underside thereof to engage with male fastener elements 126 of underlayment 114 to secure roof membrane 116. A slip sheet 150 is provided between underlayment 114 and flexible roof membrane 116 to temporarily prevent engagement of respective fastener elements 126 and 136 of underlayment 114 and roof membrane 116. The position of flexible roof membrane 116 over underlayment 114 is then accurately adjusted, e.g., aligned with underlayment 114. Slip sheet 150 is then moved or removed to allow engagement of fastener elements 136 of flexible roof membrane 116 with fastener elements 126 of underlayment 114.

Slip sheet 150 is preferably a thin, flexible web that will not engage with either of fastener elements 126 or 136. In some cases, slip sheet 150 is a narrow masking material used only for positioning the edge of flexible roof membrane 116 at the edges, corner or seams of an installation. In other cases, slip sheet 150 is a larger masking material inserted under the width of flexible roof membrane 116 as it is unrolled or moved into place or, alternatively, under entire rows of flexible roof membrane 116.

In one application, slip sheet 150 is pre-rolled with flexible roof membrane 116 for storage and shipping and ease of installation. In some cases, slip sheet 150 extends beyond the outer wrap of flexible roof membrane 116 on the roll to provide a protective covering wrap about the rolled flexible roof membrane 116. This protective covering prevents abrasion of flexible roof membrane 116 during storage, transport and installation.

In some cases, a second slip sheet may be used adjacent first slip sheet 150 to prevent fastener elements 126 and 136 from engaging beyond the region of first slip sheet 150. Slip sheets may be sequentially positioned and removed from between flexible roof membrane 116 and underlayment 114 to engage incremental regions of fasteners 126 and 136. In other cases slip sheet 150 is incrementally advanced or slid between flexible roof membrane 116 and underlayment 114 to incrementally engage fastener elements 126 and 136. For example, slip sheet 150 may extend the width of a roll to be unrolled and may be slid along as flexible roof membrane 116 is unrolled, positioned and pressed into engagement. Flexible roof membrane 116 can be brushed, broomed or swept to initially engage fastener elements 126 and 136 and subsequently rolled to enhance fastener engagement.

In some applications, the roofing membrane 116 is rolled out over the foam board underlayment 114 without using a slip sheet and is broomed to promote engagement of the touch fasteners 126 and 136 present on roofing membrane 116 and foam board underlayment 114.

In some applications, an adhesive can be applied to portions of the foam board and/or membrane, for example along a roof edge portion. The adhered portions can be broomed or rolled to promote adhesion.

In other applications, engagement of fastener elements 126 and 136 is mechanically enhanced using, for example, brooming, rollers, orbital massagers, multi-directional stretching and the like. Such rolling may be accompanied by vibrating, oscillating or other action to enhance fastener engagement. In one application, multiple rollers with multiple orientations are passed over the membrane to increase fastener engagement. A marker such as a removable ink is used to indicate treated areas. Flexible roof membrane 116 may be stretched during or after engagement of fasteners 126 and 136 to further enhance engagement.

Moisture travels laterally through the interstices between fasteners elements 126 or 136 to escape from beneath flexible roof membrane 116. Moisture movement is facilitated by gravity, capillary action, evaporation, air movement, temperature variation and/or other environmental effects and/or transport mechanisms. For example, the roof deck 112 may be sloped and/or underlayment 114 tapered to provide for water runoff on both sides of membrane 116.

Figure 19:
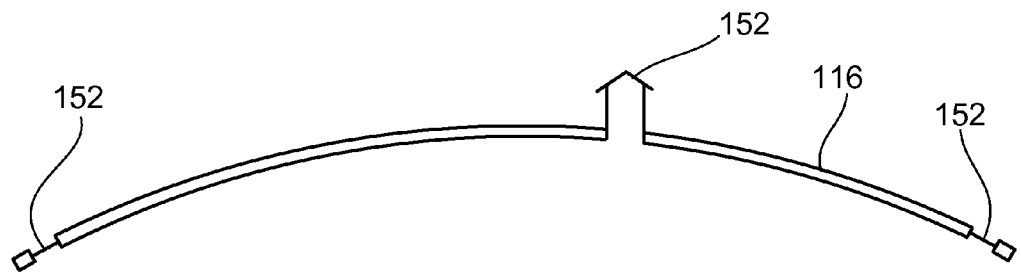
FIG. 19 is a side view of a membrane roof installation including vents.

With reference to FIG. 19, vents 152 are provided through membrane 116 and include breathable membranes or shanty caps, on lateral roof surfaces or are otherwise environmentally shielded to allow moisture to escape from under membrane 16 while preventing intrusion of rain and other moisture. Vents 152, vent coverings, flashing, flanges, pipe collars, curbing, drains, and the like may be fastened using hook and look fasteners and/or bonded or sealed to membrane 116 to prevent intrusion of rain or other moisture. Breathable membranes can be positioned along membrane 16, to provide venting, for example, in place of shanty caps at vents 152. Suitable breathable membranes include GOR-TEX™, TYVEC™ and TYPAR™.

Vents 152 are located to provide a degree of breathing or air flow through the interstices between fasteners 126, 136. In some cases, vents 152 are positioned along the roof perimeter to permit escape of run-off from below membrane 116. This is particularly important in the event of a puncture or leak in membrane 116. Vents 152 are also provided at elevated central roof locations to permit escape of moist air that may otherwise accumulate and dampen or rot underlayment 114 or other roofing materials.

The gap between the roofing membrane 116 and roofing underlayment 114 is made up of the interstices between hook and loop elements 126, 136 provide a moisture transport path. Transport and removal of moisture from between membrane 116 and underlayment 114 improves the life and efficiency of the underlayment. Additional venting is provided in one implementation by perforated tubes disposed between the membrane and insulation. The tubes can terminate at an air vent or at the roof perimeter to provide ambient venting. Alternatively, forced air venting may be provided by periodically pushing air through the tubes to drive moisture through the interstices between the hook and loop elements towards the air vents.

Vents 152 further provide a pressure equalizing mechanism by which pressure differentials across the roofing structure are equalized to reduce the effects of uplift. Vents 152 can include breathable membranes, openable flaps, shanty caps or similar pressure release passages to pass moisture and pressure from below while excluding rain and pooled water. Vents 152 can be secured to membrane 116 or to underlayment 114.

Figure 20:
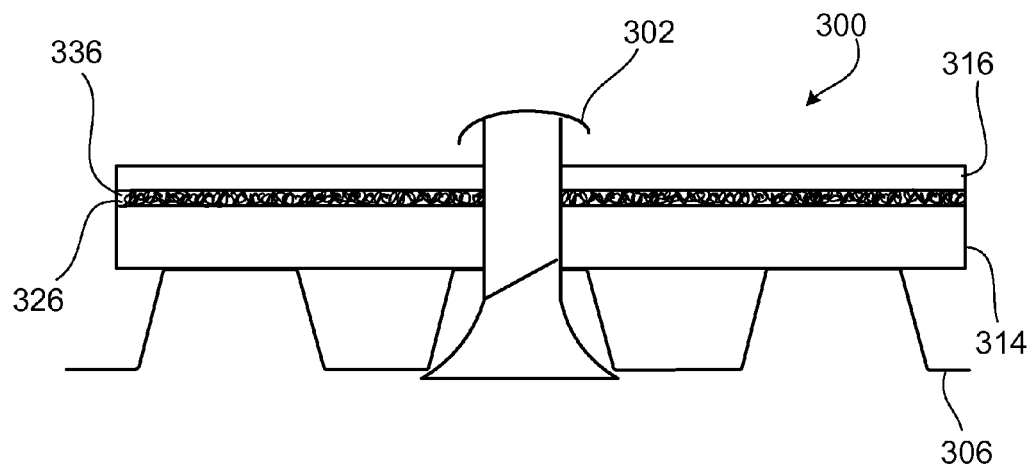
FIG. 20 is a side view of a vented roof installation.

With reference to FIG. 20, another vented roofing installation 300 is shown with pressure relief valves 302 extending through a foam board underlayment 314, roofing membrane 316 and roof deck 306. Such systems are designed to neutralize the pressure differentials caused by wind and keeps the roof membrane 316 tightly secured to a monolithic roof deck or other air barrier over steel or wood. Relief valve 302 is a one-way relief valve, e.g., an EPDM flap, provided within a pipe and is configured to move to relieve pressure from under the roof. One suitable relief valves are available from Stevens Roofing Systems. Touch fasteners 326 and 336 form a touch fastener closure between and across foam board 314 and roof membrane 316.

Figure 21:
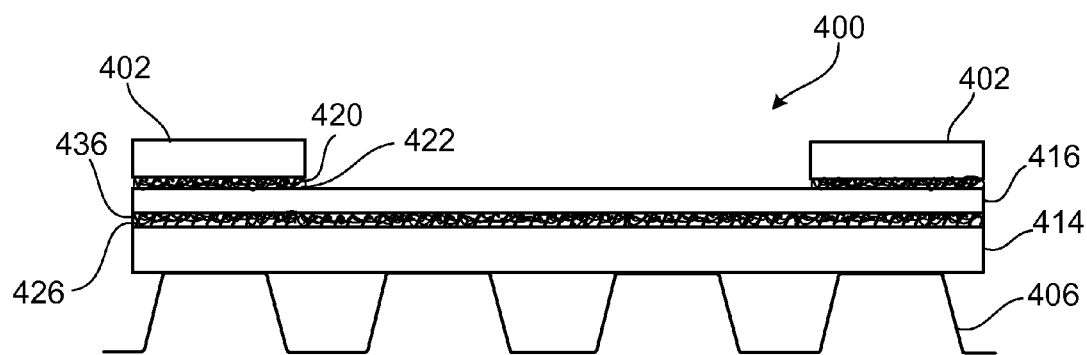
FIG. 21 is a side view of a ballasted roofing installation.

With reference to FIG. 21, a ballasted roofing installation 400 is shown, with a roof deck 406. Ballast 402 is a weight such as gravel or stone pavers or blocks distributed over the roofing membrane 416. In some ballasted implementations, paver blocks 402 are provided primarily along, roof edges and in corner regions. Paver blocks 402 can be attached to the roofing membrane 416 using cooperating touch fastener materials 420, 422 on paver blocks 402 and roofing membrane 416, in some cases, paver blocks 402 supplement the hook and loop attachment provided by cooperating touch fastener materials 426, 436 of roofing membrane 416 and underlying foam boards 414. In other cases, paver blocks 402 provide the primary or even sole means of securing membrane 416, In some cases, a distributed gravel ballast is used in the central regions of the roofing installation.

In some cases, vegetative trays, solar panels, or other roof-top accessories can serve as ballast 402. For example, In some applications, touch fastener materials can be used to secure metal roof panels, solar panels, HVAC platforms, trays for vegetative roofing assemblies, lightning protection devices or other roof mounted items. Such items can otherwise compromise the membrane if left loose or if dislodged during high winds.

Figure 22:
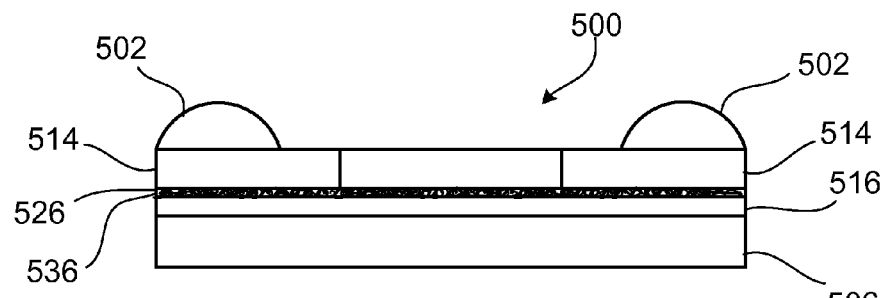
FIG. 22 is a side view of an inverted roofing installation.

With reference to FIG. 22, an inverted roofing installation 500 is shown with foam insulation boards 514 and/or paver blocks 502 installed over roofing membrane 516. Inverted installations are advantageous, for example, where food processing or existing asbestos or wiring create concerns with conventional roofing installations and through fasteners. In general, roofing membrane 516 serves as a waterproofing mechanism and the upper exposed surface of the foam board 514 or ballast 502 is exposed to the elements.

One example of a conventional inverted installation is the "Protected Membrane Roofing System" provided by Stevens Roofing Systems, and includes ballast pavers formed from a latex modified concrete on the surface of extruded polystyrene insulation foam board. These foam board pavers can serve as a weather barrier, ballast and walkable surface.

In an inverted roofing implementation, the touch fastener material 536 of the roofing membrane 516 faces upward and the cooperating touch fastener material 526 of the foam board 514 is directed downward to engage the touch fastener material 536 of roofing membrane 516. Additional hook and loop touch fastener materials can be used to secure ballast pavers 502 on top of foam board 514 to prevent scouring or displacement of pavers 502 at the edge of the roof.

In conventional paver blocks installations, the blocks are often strapped together or are connected with interlocking tongue and groove channels. Use of touch fasteners allows the paver blocks 502 to be secured to the roof in a spaced arrangement, i.e., without the need for interconnection with adjacent paver blocks 502. In some cases, paver blocks 502 are additionally or alternatively adhered directly to the top of the foam board.

Figure 23:
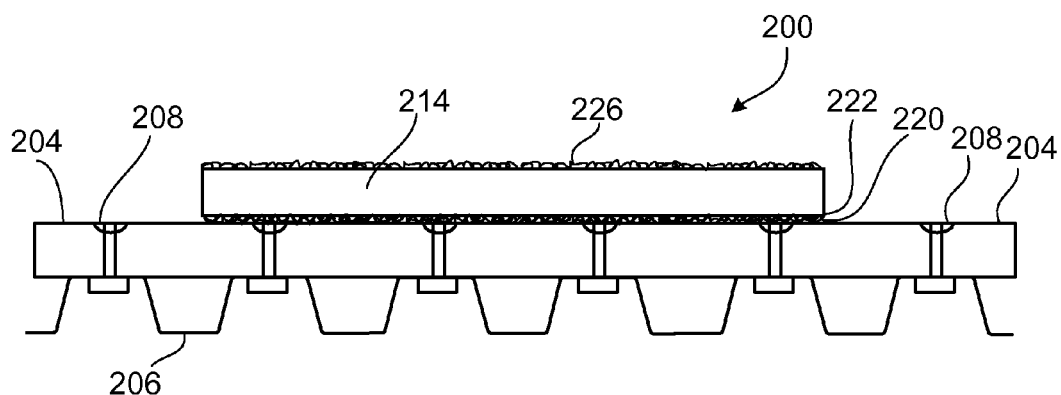
FIG. 23 is a side view of stacked or layered foam board installation.

With reference to FIG. 23, a layered or stacked roof installation 200 includes a first foam board layer 204 secured to roof decking 206 via through fasteners 208. A second foam board layer 214 is stacked or layered on top of foam board layer 204. Second foam board layer 214 can be secured to first foam board layer 204 using cooperating touch fasteners 220 and 222 as previously described or using adhesive or other fasteners. Because through fasteners 208 do not extend beyond first foam board layer 204 and because the second foam board layer 214 is secured by other than through fasteners 208, thermal bridging across through fasteners 208 is greatly reduced. First and second foam board layers 204 and 214 can be offset to distance the joints in one layer from those of another layer. Any number of layers can be stacked and various layers can be tapered or otherwise contoured to provide desired slope or other features.

In different cases, the layered foam boards 204 and 210 are connected by touch fastener closures such as hook and loop closures or self-engaging hook closures. In other cases, a touch fastener material such as a touch fastener material with engageable loops on both sides is inserted between boards faced with hook material. Still in other cases, a double hook-sided sheet can be inserted between boards face with a loop material. Still in other cases, one face of a board can include a hook touch fastener material and the adjacent face of the stacked board can include a loop touch fastener material, and vice versa. Various other variations or implementations included adhered, partially adhered, mechanically attached, and/or ballasted installations. A roofing membrane (not shown) is secured across the upper board layer 214 with touch fasteners, as described above.

Figure 24:
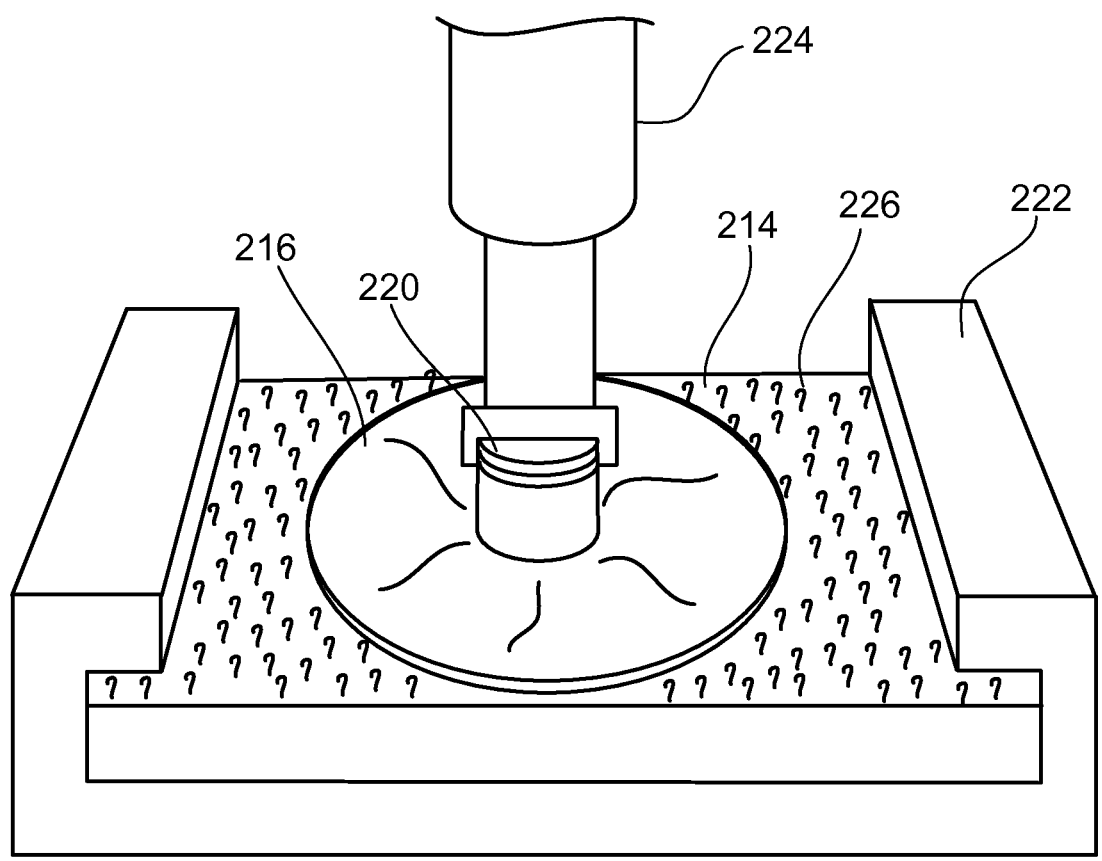
FIG. 24 is a perspective view of a test fixture for performing simulated uplift tests.

With reference to FIG. 24, roofing membrane installations of the type described were tested using a modified uplift test designed to approximate wind uplift failure modes in such installations. The uplift tests were performed using a four-inch (10 cm) diameter circle of loop fastener material (not shown) attached to a vinyl roofing membrane 216 and a six-inch (15 cm) or larger diameter area of hook fastener element material 226 adhered to a rigid acrylic backing plate 214 (6×6×0.25 in) (15.24×15.24×0.635 cm). The hook fastener elements 226 and loop material were adhered to acrylic plate 214 and vinyl membrane 216 using transfer tape (not shown).

Transfer tape strips were cut and placed in a freezer for five minutes and applied across the entire back surface of hook fastener element material 226 and the top of acrylic plate 214. Additional transfer tape strips were cut and placed in a freezer for five minutes and applied across the entire back surface of roofing membrane 216 and the back of the loop material. Ten membrane circles were then die cut for testing (five for pre-engagement testing and five for light engagement testing).

Threaded PVC caps 220 with flat, smooth machined tops were then adhered to the center of the vinyl membrane 216 circles. A first set of samples was rolled with an 11 lb. (5 kg) roller. A second set of samples was only lightly engaged, without rolling, using a single finger to press down at several intervals around the perimeter and center of the circle. For rolled engagement samples, PVC cap 220 was adhered using PVC cement after rolling of the samples. For light engagement samples, PVC cap 220 was adhered using PVC cement prior to engagement with hook tape. The samples were acclimatized to the test lab for a period prior to testing.

Acrylic backing plate 214 was secured in a test fixture 222 and PVC caps 220 were then threaded onto an MTS tensile tester 224 with a 1000 lb/454 kg. load cell used to pull upward on the center of the vinyl membrane 216 circle, i.e., perpendicular to backing plate 214. This placed the samples is tension at the center and shear at the outside edges, simulating the effects of uplift forces.

While the test samples were pulled, measurements were recorded for the maximum force and standard deviation (in lbs and psi) until failure of the fastening. For rolled samples, the maximum recorded uplift forces ranged from 45 to 63 pounds (200-280 Newtons) of force recorded at approximately 0.8 inch (20 mm) of extension.

In some implementations, the roof is constructed to withstand an average per hook up-lift force of at least about 0.022 Newton/hook (0.005 lbf/hook), at least about 0.067 Newton/hook (0.015 lbf/hook) and preferably at least about 0.133 Newton/hook (0.030 lbf/hook). For example, for a fastener array with a hook density of 1700 hooks per square inch (260 per square cm) and hook strength of about 0.0088-0.0100 lbf (0.04-0.045 Newtons) per hook, the fastening can withstand a vertical loading of approximately 15 lbf per square inch (100 KPa). Where not all hooks are always fully engaged in a given fastening, an average force per hook is determined through uplift testing of a fastening of a known hook density and engaged surface area.

It is believed that a certain amount of lateral low load fastening displacement or shear slack between the fastener elements of the roof membrane and those of the underlayment afford the fastening a degree of fatigue resistance to repeated wind loading, as well as greater maximum load resistance.

Figure 25:
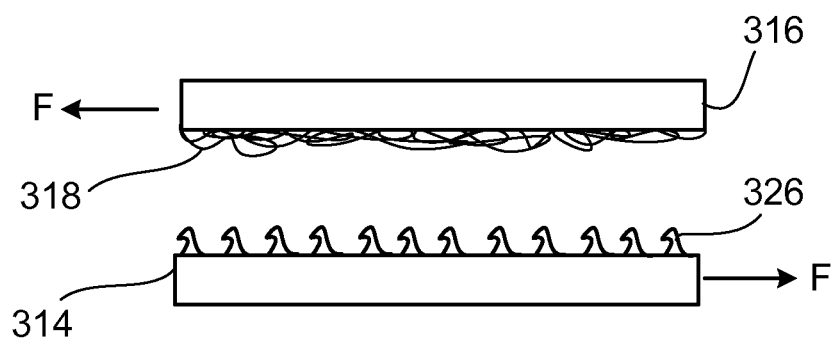
FIG. 25 is a side view of a shear slack test of a hook and loop combination.

With reference to FIG. 25, to determine shear slack, as that phrase is used herein, hook material 326 is laminated to a rigid substrate, such as, for example, foam board 314 and is engaged with loop material 318 laminated to a second rigid substrate 316. Fastening sample sections are prepared with a one inch by one inch overlap (6.45 sq. cm). Substrate 314 is then loaded in a first direction relative to substrate 316 at a pull rate of about 24 inches (61 cm) per minute using a programmable MTS tester until a shear load F of 0.025 pounds per square inch (1.7 KPa) is obtained.

Once the target shear load has been reached in a first direction and the displacement determined, the direction of movement is reversed to determine the displacement in the other direction at the same load. The MTS tester is programmed to change directions with minimal delay to reduce the effects of relaxation or slippage in the fastening closure. Shear slack is then calculated as the sum of the in-plane movement of substrate 314 relative to substrate 316, in two opposing directions at the target load. For symmetrical hook fastener elements, such as mushroom hooks, the tests can be set up for any two opposing directions.

Figure 26:
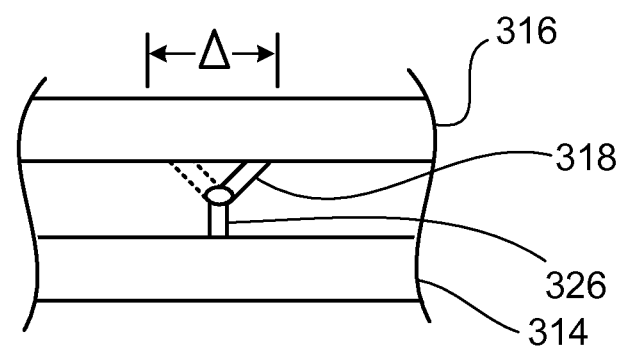
FIG. 26 is a side view of a single hook and loop fastening during shear slack testing.

As shown in FIG. 26, with fasteners of symmetric machine direction configuration, shear slack $\Delta$ is generally equal to double the range of movement in any single given direction. The solid line position of loop 318 shows a first loop extension relative to hook 326 and the dashed line position of loop 318 shows a second loop extension relative to hook 326. Measurement of the range of movement of between these extensions of loop 318 at the predetermined load provides a measurement of shear slack $\Delta$.

Figure 27:
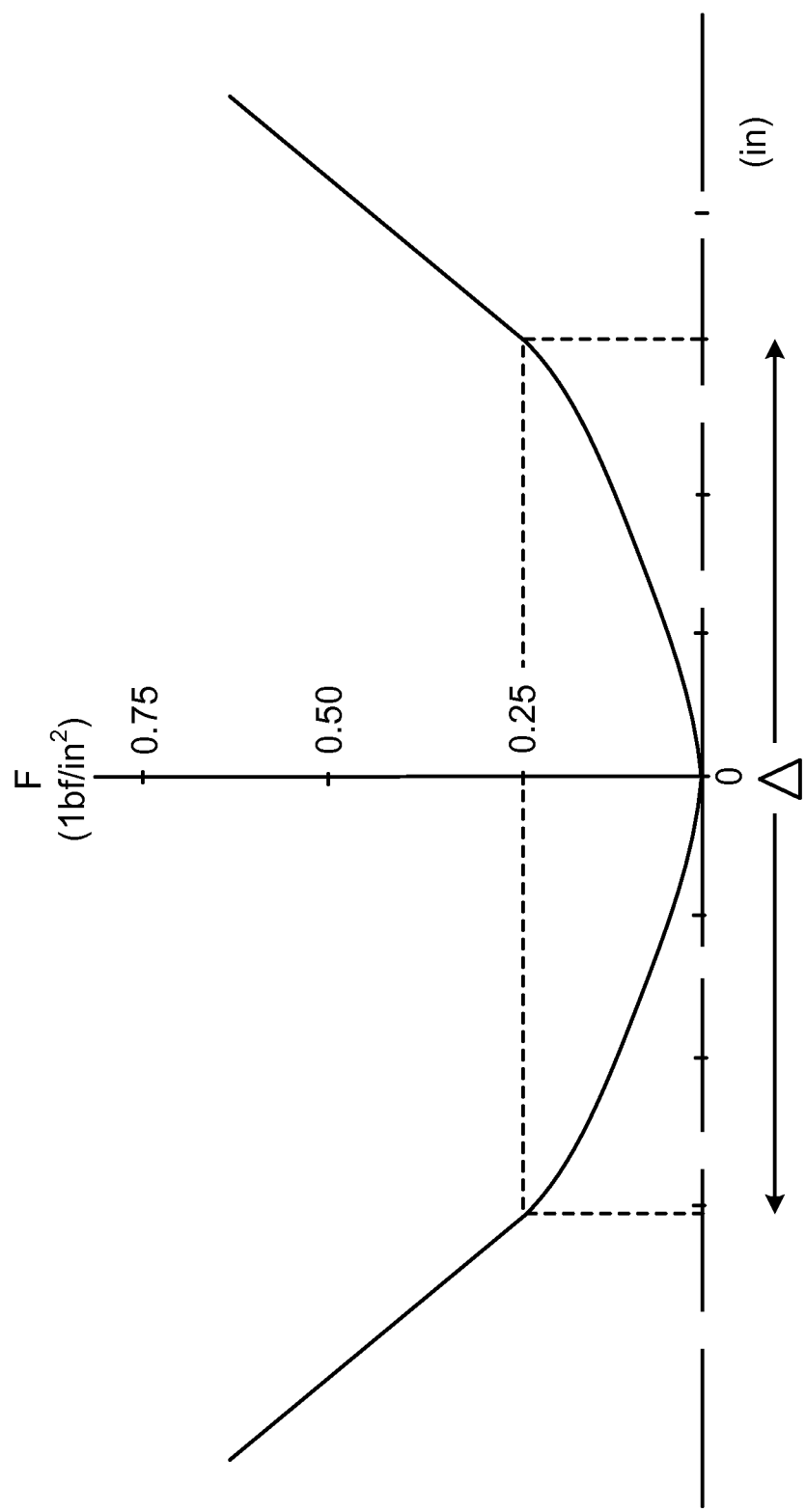
FIG. 27 is a plot illustrating shear slack in sample fastenings.

The representative plot of FIG. 27 illustrates displacement of a roofing fastening over a range of shear loading. The range of displacement in two opposed directions at the target 0.025 pounds per square inch (1.7 KPa) loading is the shear slack of the fastening. In some implementations, the fastening exhibits about 0.060 inch+/−0.030 in. (1.524 mm+/−0.762 mm) of shear slack under a shear force of about 0.025 pounds per square inch (0.17 KPa). While smaller populations of hook and loop pairs may be separated below 0.025 pounds per square inch, the distributed population of engaged hook and loop pairs exhibits shear slack of about 0.060 in (1.524 mm) at about 0.25 pound per square inch (1.7 KPa) shear load. In other words, the average one-directional displacement from rest is approximately 0.030 in (0.762 mm) at 0.025 pounds per square inch (0.17 KPa) shear load. It is believed that shear slack in the range of 0.030 to 0.090 inch (0.762 to 2.286 mm), and preferably between 0.050 and 0.070 inch (1.27 and 1.778 mm), allows excessive uplift loads to be effectively spread over a larger number of fastener engagements, thus improving overall load resistance.

It is believed that this range of shear slack accommodates limited displacement of the fastening due to uplift loading by engaging additional hook and loop pairs while extending the population of already engaged pairs over a distributed fastening area. Thus, during initiation of an uplift cycle, displacement in the shear slack range serves to strengthen the fastening, increasing resistance of the roofing fastening to the uplift forces. It is also believed that this shear slack results in a more durable fastening than that provided by adhesive roofing solutions, especially because conventional roofing adhesives typically fail with more than nominal displacement, particularly after numerous cycles. Moreover, hook and loop fasteners allow fastenings to knit or heal in the event of a partial separation.

Shear slack can be adjusted by varying the hook and/or loop characteristics. For example, a loop material having two or more loop sizes will tend to provide a lower shear slack than a material with the single greater loop length, and longer loops generally provide more shear slack than shorter loops. Shear slack may also be varied by varying the hook head thickness or head or stem width or shape.

Some implementations provide advances in hail resistance over existing roofing installations. Hail resistance is a function of the integrity of a roofing installation sample before and after an impact from a projectile under test conditions. Specifically, the degree of deformation or other damage and membrane separation can be measured after such impacts. For example, simulated hail impacts on a conventional adhered installation using paper or foil faced foam boards produced a tear or crease in the facing sheet and localized separation of the adhesive bond between the membrane and the foam board. Such localized separation can later become an initiation zone for uplift during high wind loads.

Through experimentation, it was determined that the loft and/or shear slack in a hook and loop touch fastener closure increases the separation resistance and puncture resistance of the roofing assembly. The hook and loop closure between the roofing membrane and foam board maintained its integrity after simulated hail impacts, preventing such impact zones from becoming separation initiation zones during uplift loading. Thus, even though the foam board yielded locally from hail impact in some tests, the roofing membrane remained fully engaged with the foam board across the impact zone.

Hail impact simulations were performed using a 2.2 lb (1 kg), 2.5 in (63.5 mm) diameter smooth round weight dropped from a height of about 9 feet (2.7 meters). Pressure sensitive film available under the PRESSUREX™ brand was placed between the foam board and roofing membrane to indicate the pressure distribution characteristics of different materials combinations. The density of the pressure film color patterns after impact was correlated with the degree and distribution of pressures exerted.

Testing showed that a polymeric touch fastener facing material on the foam board plastically deformed evenly around the impact zone, without any visible tearing or creasing. This even pressure distribution was readily visible from the surface of the test sample and further evidenced by consistent fine radial lines in the pressure film around the impact zone. It is believed that plastic deformation of the touch fastener material facing on the foam board as well as relative movement between the complementary touch fastener materials of the roofing membrane and foam board served to partially dissipate the hail impact loads. More significantly, it is believed that the presence of polymeric hook fastener material across the broad face of the foam board helps preserve the integrity of membrane to foam board attachment at any point across the roofing membrane.

A number of embodiments of the invention have been described. Nevertheless, it will be understood that various modifications may be made without departing from the spirit and scope of the invention. Accordingly, other embodiments are within the scope of the following claims.

What is claimed is:

1. A roof comprising:
  a roof deck;
  underlayment comprising foam boards each fastened to the roof deck with discrete board fasteners each extending through one of the foam boards and into the roof deck, each foam board of the underlayment carrying a field of fastener elements extending across an exposed surface of the board; and
  a flexible roof membrane extending over the underlayment, the roof membrane comprising a water-impervious sheet with a field of fastener elements disposed on an underside thereof and engaged with the fastener elements of the foam boards to secure the roof membrane;
  wherein the discrete board fasteners each carry a field of fastener elements that releasably engage with the fastener elements of the roof membrane to secure the membrane to the fastener elements.

2. The roof of claim 1, wherein the discrete board fasteners each comprise a flange that overlays an outer foam board surface to retain the foam board to the roof deck, and wherein the flange carries the field of fastener elements that releasably engage with the fastener elements of the roof membrane.

3. The roof of claim 2, wherein the flange is formed by a washer through which a shank of the discrete board fastener extends, with a head of the fastener bearing against the washer.

4. The roof of claim 1, wherein the fastener elements comprise molded fastening projections with individual resin stems extending from a common resin layer on an outer surface of the discrete board fastener.

5. The roof of claim 1, wherein the fields of fastener elements extending across exposed surfaces of the underlayment boards are coplanar with the fields of fastener elements carried by the discrete board fasteners.

6. The roof of claim 1, wherein the fields of fastener elements carried on the underlayment boards and on the discrete board fasteners comprise male touch fastener elements, and wherein the field of fastener elements on the underside of the roof membrane comprises exposed fiber loops or fiber segments configured to be snagged by the male touch fastener elements.

7. The roof of claim 1, wherein the fastener elements of the underlayment and the fastener elements of the roof membrane form a fastening with a nominal shear slack of between about 0.762 mm (0.030 inch) and 1.524 mm (0.090 inch).

8. The roof of claim 1, configured to withstand an up-lift force of at least about 90 pounds/square foot.

9. The roof of claim 1, wherein an outer surface of at least one of the discrete board fasteners comprises a peripheral anti-peel flap carrying fastener elements for engaging fastener elements of the roof membrane.

10. A method of roofing a structure, the method comprising:
  securing underlayment to a roof deck, the underlayment comprising foam boards each fastened to the roof deck with discrete board fasteners each extending through one of the foam boards and into the roof deck, each foam board of the underlayment carrying a field of fastener elements extending across an exposed surface of the board, and each discrete board fastener carrying a field of fastener elements; and
  positioning a flexible roof membrane to extend across the secured underlayment, the roof membrane comprising a water-impervious sheet with a field of fastener elements exposed across one face thereof to engage with the fastener elements of the underlayment and of the discrete board fasteners, to secure the roof membrane.

11. The method of claim 10, further comprising mechanically enhancing engagement of the fastener elements of the flexible roof membrane with the fastener elements of the discrete board fasteners and underlayment.

12. The method of claim 11, wherein mechanically enhancing the engagement of the fastener elements comprises rolling or brooming the outer surface of the positioned membrane.

* * * * *